(12) United States Patent
Ishiwata

(10) Patent No.: US 10,754,139 B2
(45) Date of Patent: Aug. 25, 2020

(54) THREE-DIMENSIONAL POSITION INFORMATION ACQUIRING METHOD AND THREE-DIMENSIONAL POSITION INFORMATION ACQUIRING APPARATUS

(71) Applicant: OLYMPUS CORPORATION, Hachioji-shi, Tokyo (JP)

(72) Inventor: Hiroshi Ishiwata, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 190 days.

(21) Appl. No.: 15/977,280

(22) Filed: May 11, 2018

(65) Prior Publication Data

US 2018/0259763 A1 Sep. 13, 2018

Related U.S. Application Data

(62) Division of application No. 14/970,924, filed on Dec. 16, 2015, now Pat. No. 9,995,924.

(30) Foreign Application Priority Data

Dec. 16, 2014 (JP) ................. 2014-254341

(51) Int. Cl.
| | | |
|---|---|---|
| G06K 9/00 | (2006.01) | |
| G06K 7/00 | (2006.01) | |
| G01B 11/30 | (2006.01) | |
| G02B 21/36 | (2006.01) | |
| H04N 13/106 | (2018.01) | |

(Continued)

(52) U.S. Cl.
CPC .......... *G02B 21/367* (2013.01); *G02B 21/18* (2013.01); *H04N 13/106* (2018.05);
(Continued)

(58) Field of Classification Search
USPC .......... 382/154, 312; 348/E13.005; 356/602
See application file for complete search history.

(56) References Cited

U.S. PATENT DOCUMENTS 7,982,948 B2   7/2011  Nakano
8,619,126 B2 * 12/2013  Gharib ............... G01B 11/2509
                                                    348/46

(Continued)

FOREIGN PATENT DOCUMENTS

JP       2013235110 A     11/2013

OTHER PUBLICATIONS

Japanese Office Action dated Jun. 6, 2018 (and English language translation thereof) issued in counterpart Japanese Application No. 2014-254341.

*Primary Examiner* — Kathleen Y Dulaney
(74) *Attorney, Agent, or Firm* — Holtz, Holtz & Volek PC

(57) ABSTRACT

A three-dimensional position information acquiring method includes acquiring an image of a first optical image; thereafter acquiring an image of a second optical image; and performing a computation using image data of the first and second optical images. Acquisition of the image of the first optical image is based on light beams having passed through a first area. Acquisition of the image of the second optical image is based on light beams having passed through a second area. The positions of the centers of the first and second areas are both away from the optical axis of an optical system in a plane perpendicular to said optical axis. The first and second areas respectively include at least portions that do not overlap with each other. Three-dimensional position information about an observed object is acquired by the computation. The first and second areas are formed at rotationally symmetric positions. The computation performs subtraction processing using data of the first and second images, generates a subtracted image and then determined whether the observed object is displaced on the front or rear side relative to an in-focus position.

4 Claims, 20 Drawing Sheets

(51) Int. Cl.
*H04N 13/207* (2018.01)
*G02B 21/18* (2006.01)
*H04N 13/218* (2018.01)
*H04N 13/211* (2018.01)
*H04N 13/254* (2018.01)
*H04N 13/00* (2018.01)
*G02B 7/34* (2006.01)

(52) U.S. Cl.
CPC ......... *H04N 13/207* (2018.05); *H04N 13/211* (2018.05); *H04N 13/218* (2018.05); *H04N 13/254* (2018.05); *G02B 7/34* (2013.01); *H04N 2013/0081* (2013.01); *H04N 2013/0092* (2013.01)

(56) References Cited

U.S. PATENT DOCUMENTS

| | | | |
|---|---|---|---|
| 8,698,078 B2 | 4/2014 | Phifer et al. | |
| 2004/0105074 A1* | 6/2004 | Soliz | G06T 7/593 351/206 |
| 2004/0114806 A1 | 6/2004 | Katayama et al. | |
| 2004/0264764 A1 | 12/2004 | Kochi et al. | |
| 2005/0031192 A1 | 2/2005 | Sieckmann | |
| 2007/0183647 A1 | 8/2007 | Allman et al. | |
| 2008/0031513 A1* | 2/2008 | Hart | G01B 11/2545 382/154 |
| 2008/0285827 A1 | 11/2008 | Meyer et al. | |
| 2009/0022393 A1* | 1/2009 | Bar-Zohar | G06T 7/593 382/154 |
| 2011/0090326 A1 | 4/2011 | Kenny et al. | |
| 2011/0181701 A1 | 7/2011 | Varslot et al. | |
| 2011/0199458 A1 | 8/2011 | Hayasaka et al. | |
| 2012/0236168 A1* | 9/2012 | Tsutsumi | H04N 5/23267 348/208.4 |
| 2014/0126806 A1* | 5/2014 | Eguchi | G02B 21/367 382/154 |
| 2014/0147049 A1* | 5/2014 | Sumitomo | G06T 7/593 382/190 |
| 2015/0153166 A1* | 6/2015 | Orschel | G01B 9/0201 348/128 |

\* cited by examiner

THREE-DIMENSIONAL POSITION INFORMATION ACQUIRING METHOD AND THREE-DIMENSIONAL POSITION INFORMATION ACQUIRING APPARATUS

CROSS-REFERENCE TO RELATED APPLICATION

The present application is a Divisional application of U.S. Ser. No. 14/970,924, filed Dec. 16, 2015, which is based upon and claims the benefit of priority from the prior Japanese Patent Application No. 2014-254341 filed on Dec. 16, 2014; the entire contents of both of which are incorporated herein by reference.

BACKGROUND OF THE INVENTION

Field of the Invention

The present invention relates to a method and apparatus for acquiring a three-dimensional position information of an observed object.

Description of the Related Art

A microscope is an apparatus used to observe an object. The optical system of an microscope typically includes, an objective lens, an aperture stop, an tube lens, and an image pickup element arranged in order from the object side. Moreover, the optical axis of the objective lens and the optical axis of the tube lens are aligned, and the center of the aperture of the aperture stop is also aligned with the optical axis.

FIGS. 1A, 1B, and 1C are diagrams showing states of light beams in a typical optical system as described above. FIG. 1A is a diagram showing a state of converging light beams, and FIGS. 1B and 1C are diagrams showing states of a point spread function formed on the image pickup element.

When light from an object point on the optical axis is focused by the optical system, the light is focused at a position P2 as indicated by broken lines in FIG. 1A. Theoretically or geometrical optically, the image formed at the position P2 is a point. However, the image is not a point actually. As illustrated by solid lines in FIG. 1A, the image has spread to some extent due to diffraction. Here, the image which has such spread will be referred to as a point spread function.

When a displacement between the position of an observed object and the in-focus position of the optical system is generated, spread in the point spread function changes. However, if an amount of displacement of the observed object from the in-focus position of the optical system corresponds to an amount which is smaller than the image side depth of focus of the optical system, the spread in the point spread function does not change largely. The amount of displacement of the observed object from the in-focus position of the optical system will be referred to as an object side displacement amount. The depth of focus on the image side will be simply referred to as a depth of focus.

In FIG. 1A, a region in which the spread of the point spread function does not change largely is represented as the hatched area. In FIG. 1B, the spread of the point spread function is represented by the hatched area. Moreover, a predetermined pixel region is defines as a 4×4 pixel area.

When the position of the observed object and the in-focus position of the optical system coincide with each other, the light from the observed object is focused at the position P2.

On the other hand, when the position of the observed object is displaced from the in-focus position of the optical system, the light from the observed object is focused at a position displaced from the position P2 toward a position P1 or a position P3. In the case where the object side displacement amount corresponds to an amount which is smaller than the depth of focus, the image of the observed object is formed between the position P1 and the position P3.

In the case where the object side displacement amount corresponds to an amount which is smaller than the depth of focus, the spread of the point spread function is kept within the predetermined pixel area at each of positions P1, P2, and P3 as shown in FIG. 1B. More specifically, the circle representing the spread of the point spread function is inscribed in the predetermined pixel area.

All of positions P1, P2, and P3 are positions which are located within the depth of focus. Therefore, in the case where the object side displacement amount corresponds to an amount which is smaller than the depth of focus, a change in the object side displacement amount does not appear as a change in the brightness of the point spread function or a change in the brightness of the image of the observed object.

In cases where there is a projection or a recess on the surface of the observed object, the height of the projection or the depth of the recess corresponds to the object side displacement amount. Therefore, in cases where the height of the projection or the depth of the recess on the surface of the observed object corresponds to an amount which is smaller than the depth of focus, a change of the projection or the recess on the surface of the observed object does not appear as a change in the brightness of the point spread function or a change in the brightness of the image of the observed object.

Moreover, at all of positions P1, P2, and P3, the point spread function is located at the same position on the image pickup element. Therefore, in the case where the object side displacement amount corresponds to an amount which is smaller than the depth of focus, a change in the object side displacement amount does not appear as a change in the position of the point spread function or a change in the position of the image of the observed object.

As described above, the object side displacement amount corresponds to the height of a projection or the depth of a recess. In cases where the height of the projection or the depth of the recess corresponds to an amount which is smaller than the depth of focus, a change of the projection or the recess on the surface of the observed object does not appear as a change in the position of the point spread function or a change in the position of the image of the observed object. Therefore, in cases where the height of the projection or the depth of the recess on the surface of the observed object corresponds to an amount which is smaller than the depth of focus, the height of the projection or the depth of the recess cannot be detected by an ordinary optical system.

A defocus amount is defined as the length d of the hatched region in FIG. 1A. The depth of focus, which is determined by the pixel size, is represented by the area in which the circle representing the spread of the point spread function does not exceed the predetermined pixel area (4×4 pixel area). As shown in FIG. 1A, the radius cp of the point spread function is expressed by the following equation (1):

$$\varphi = (d/2) \times NA' \qquad (1),$$

where

NA' is the numerical aperture of the imaging optical system on the image side.

The resolution of the image pickup element can be expressed by the size of the pixels. The inverse of the resolution of the image pickup element is equal to the size of the two pixels. When the size of one pixel is $d_{pix}$, the size of two pixels is $2d_{pix}$. Since it is possible to replace φ to the size of two pixels, the defocus amount can be expressed by the following equation (2):

$$d = 4d_{pix}/NA' \qquad (2).$$

Moreover, the resolution of the imaging optical system is expressed by the following equation (3):

$$\delta_{OBS} = \lambda/(2 \times NA') \qquad (3),$$

where

λ is the wavelength, and $\delta_{OBS}$ is the resolution of the imaging optical system.

In the case where the resolution of the imaging optical system and the resolution of the image pickup element are equal to each other, in other words, in the case where the cut-off frequency of the imaging optical system and the Nyquist frequency of the image pickup element are equal to each other, since it is possible to replace $\delta_{OBS}$ to the size of two pixels, the resolution of the imaging optical system can be expressed by the following equation (3'):

$$2d_{pix} = \lambda/(2 \times NA') \qquad (3').$$

From equations (2) and (3'), the defocus amount can be expressed by the following equation (4):

$$d = \lambda/NA'^2 \qquad (4).$$

Since the depth of focus of the imaging optical system is represented by $\lambda/NA'^2$, the depth of focus determined by the pixel size is equal to the depth of focus of the imaging optical system. Therefore, in the case where the resolution of the imaging optical system and the resolution of the image pickup element are equal to each other, the depth of focus of the observation system can be represented by the depth of focus of the imaging optical system or the depth of focus determined by the pixel size.

In the case where the resolution of the imaging optical system is lower than the resolution of the image pickup element, the point spread function is sampled by an area larger than the predetermined pixel area. In this case, the depth of focus of the observation system can be represented by the depth of focus of the imaging optical system, that is, $\lambda/NA'^2$.

In the case where the imaging optical system is an optical system of a microscope, the magnification of the imaging optical system changes with replacement of the objective lens. Since the numerical aperture NA' also changes with the change in the magnification, the resolution of the imaging optical system also changes. A decrease in the magnification of the imaging optical system with replacement of the objective lens may make the numerical aperture NA' larger than that in the state in which the magnification is high, in some cases. When the numerical aperture NA' becomes larger, the resolution of the imaging optical system becomes higher than the resolution of the image pickup element.

Here, we will discuss a case where the resolution of the imaging optical system is higher than the resolution of the image pickup element and a case where the resolution of the imaging optical system and the resolution of the image pickup element are equal to each other in comparison. Firstly, comparison of the depth of focus of the imaging optical system will be discussed.

The numerical aperture NA' is larger in the case where the resolution of the imaging optical system is higher than the resolution of the image pickup element than in the case where the resolution of the imaging optical system is equal to the resolution of the image pickup element. Therefore, the depth of focus of the imaging optical system is smaller in the case where the resolution of the imaging optical system is higher than the resolution of the image pickup element than in the case where the resolution of the imaging optical system is equal to the resolution of the image pickup element.

Next, comparison of the defocus amount, which determines the depth of focus, will be discussed. As will be seen by comparison of FIGS. 1B and 1C, the spread of the point spread function is smaller in the case where the resolution of the imaging optical system is higher than the resolution of the image pickup element than in the case where the resolution of the imaging optical system is equal to the resolution of the image pickup element. As described above, the depth of focus determined by the pixel size is the range in which the circle representing the spread of the point spread function does not exceed the predetermined pixel area. Therefore, the depth of focus determined by the pixel size is larger in the case where the resolution of the imaging optical system is higher than the resolution of the image pickup element than in the case where the resolution of the imaging optical system is equal to the resolution of the image pickup element.

From the above follows that in the case where the resolution of the imaging optical system is higher than the resolution of the image pickup element, the depth of focus determined by the pixel size is larger than the depth of focus of the imaging optical system. Therefore, in the case where the resolution of the imaging optical system is higher than the resolution of the image pickup element, the depth of focus of the observation system is represented by the depth of focus determined by the pixel size rather than the depth of focus of the imaging optical system.

The depth of focus of the observation system is larger in the case where the resolution of the imaging optical system is higher than the resolution of the image pickup element than in the case where the resolution of the imaging optical system is equal to the resolution of the image pickup element. Therefore, there is a possibility that the object side displacement amount that can be detected in the case where the resolution of the imaging optical system is equal to the resolution of the image pickup element cannot be detected in the case where the resolution of the imaging optical system is higher than the resolution of the image pickup element.

There are apparatuses that acquire various information of an observed object, which include apparatuses that utilize the entire light from an observed object and apparatuses that utilize a part of the light from an observed object. An apparatus that utilizes a part of the light from an observed object is disclosed in Japanese Patent Application Laid-Open No. 2013-235110.

The apparatus disclosed in Japanese Patent Application Laid-Open No. 2013-235110 is an auto-focus apparatus having an optical system that is different from the above-described typical optical system. In this apparatus, a plurality of apertures are arranged at a position substantially conjugate with the position of the exit pupil of the objective lens system. The apertures are arranged at positions away from the optical axis of the objective lens system. This apparatus can calculate the amount of displacement from the in-focus position. Therefore, it is possible to obtain height information of an observed object by using this apparatus.

SUMMARY OF THE INVENTION

A three-dimensional position information acquiring method according to the present invention comprises:

acquiring an image of a first optical image;

acquiring an image of a second optical image after acquiring the image of the first optical image; and performing a predetermined computation using image data of the first optical image and image data of the second optical image, wherein acquisition of the image of the first optical image is performed based on light beams having passed through a first area, acquisition of the image of the second optical image is performed based on light beams having passed through a second area, the position of the center of the first area and the position of the center of the second area are both away from the optical axis of an optical system in a plane perpendicular to the optical axis of the optical system, the first area and the second area respectively include at least portions that do not overlap with each other, and three-dimensional position information about an observed object is acquired by the predetermined computation.

A three-dimensional position information acquiring apparatus according to the present invention comprises:

a light source;

an illumination optical system that guides light from the light source to an observed object;

an imaging optical system that forms an image of the observed object;

an image pickup element that picks up the image of the observed object;

an aperture element;

a processing device that processes the picked up image by computation processing; and a drive unit that drives the aperture element, wherein the aperture element has an aperture that allows a portion of light coming from points on the observed object to pass through it, a first area is formed by positioning the aperture at a first position and a second area is formed by positioning the aperture at a second position, the computation processing includes:

acquiring an image of a first optical image, acquiring an image of a second optical image after acquiring the image of the first optical image, and performing a predetermined computation using image data of the first optical image and image data of the second optical image, wherein acquisition of the image of the first optical image is performed based on light beams having passed through the first area, acquisition of the image of the second optical image is performed based on light beams having passed through the second area, the position of the center of the first area and the position of the center of the second area are both away from the optical axis of the optical system in a plane perpendicular to the optical axis of the optical system, the first area and the second area respectively include at least portions that do not overlap with each other, and three-dimensional position information about an observed object is acquired by the predetermined computation.

BRIEF DESCRIPTION OF THE DRAWINGS

FIG. 1A is a diagram showing a state of converging light beams, and FIGS. 1B and 1C are diagrams showing states of a point spread function formed on an image pickup element.

FIG. 2A is a diagram showing the state of converging light beams, and FIGS. 2B, 2C, and 2D are diagrams showing states of a point spread function formed on an image pickup element.

FIG. 3A is a diagram showing light beams passing through the first area, FIG. 3B is a diagram showing light beams passing through the second area, and FIG. 3C is a diagram showing the first area and the second area.

FIG. 4A shows a first image, and FIG. 4B shows a second image.

FIG. 13A is a two-dimensional image, and FIG. 13B is an image representing a row of information in FIG. 13A of which the spatial frequency in the Y direction is zero.

FIG. 19A is a diagram illustrating sectioning of the object side displacement amount by δF, FIG. 19B is a diagram showing the shape of an observed object, FIG. 19C is a diagram showing binarized three-dimensional image information.

FIG. 20A is a diagram showing a state in which the first level surface of the observed object coincides with the in-focus position and images acquired in that state, FIG. 20B is a diagram showing a state in which the second level surface of the observed object coincides with the in-focus position and images acquired in that state, FIG. 20C is a diagram showing a state in which the third level surface of the observed object coincides with the in-focus position and images acquired in that state.

DETAILED DESCRIPTION OF THE INVENTION

In the following, an embodiment of the three-dimensional position information acquiring method and the three-dimensional position information acquiring apparatus according to the present embodiment will be described in detail with reference to the drawings. It should be noted that the present invention is not restricted by the embodiment.

Before describing the embodiment of the three-dimensional position information acquiring method and the three-dimensional position information acquiring apparatus, the basic principle will be described briefly. The description of the principle will be made with reference to the first area and the second area, and a state in which the center of the first area and the center of the second area do not coincide with the optical axis of the optical system (which will be hereinafter referred to as "decentered state") will be described. In the following, a description will be made with reference to the first area.

Figure 2A:
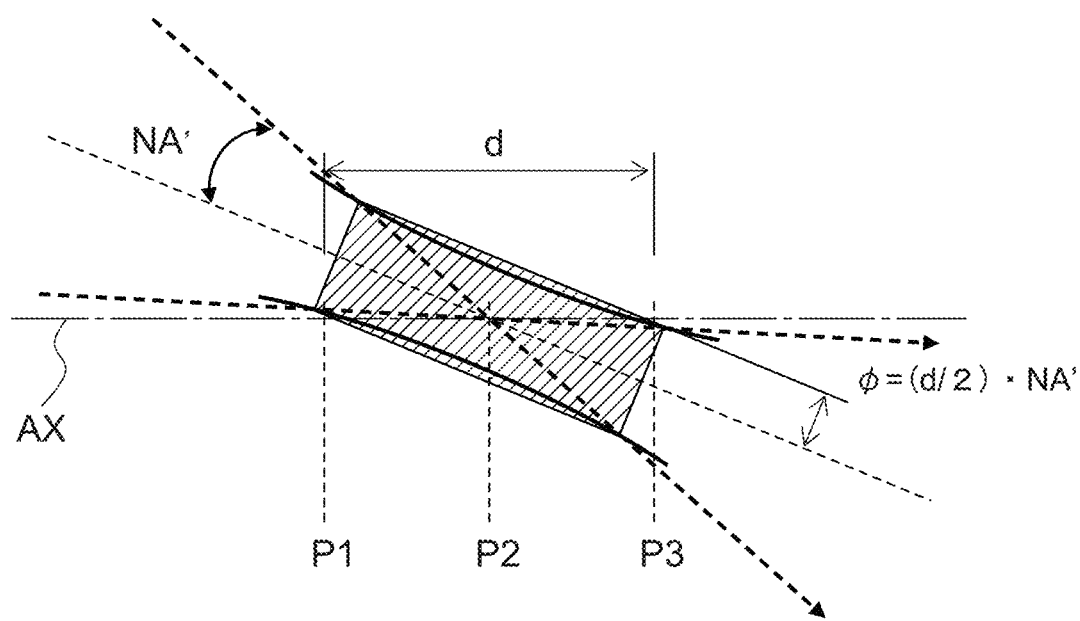
FIGS. 2A, 2B, 2C, and 2D are diagrams showing states of light beams in the decentered state, where
Figure 2B:
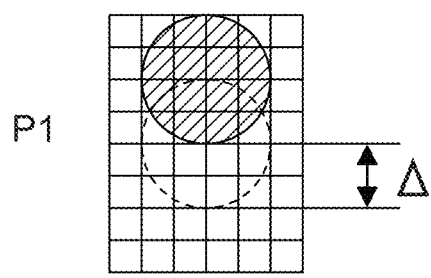
Figure 2C:
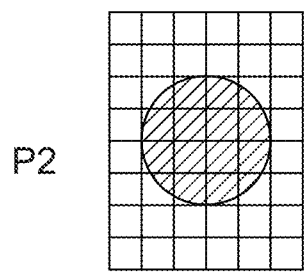
Figure 2D:
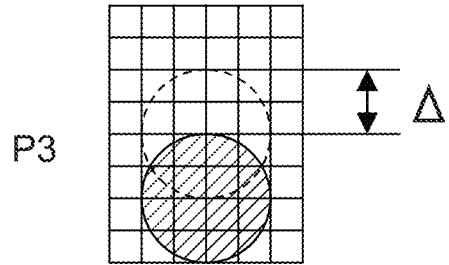

FIGS. 2A, 2B, 2C, and 2D are diagrams showing states of light beams in the decentered state, where FIG. 2A is a diagram showing the state of converging light beams, and FIGS. 2B, 2C, and 2D are diagrams showing states of a point spread function formed on an image pickup element.

In FIG. 2A, a region in which the spread of the point spread function does not change largely is represented as the hatched area. In FIGS. 2B, 2C, and 2D, the spread of the point spread function is represented by the hatched areas. A predetermined pixel region is defines as a 4×4 pixel area.

When the position of an observed object and the in-focus position of the optical system coincide with each other, the light from the observed object is focused at a position P2. On the other hand, when the position of the observed object is displaced from the in-focus position of the optical system, the light from the observed object is focused at a position displaced from the position P2 toward a position P1 or a position P3.

In the decentered state, in the case where the object side displacement amount corresponds to an amount which is smaller than the depth of focus, the spread of the point spread function is kept within the predetermined pixel area at each of positions P1, P2, and P3 as shown in FIGS. 2B, 2C, and 2D. More specifically, the circle representing the spread of the point spread function is inscribed in the predetermined pixel area.

All of positions P1, P2, and P3 are positions which are located within the depth of focus. Therefore, in the decentered state, in the case where the object side displacement amount corresponds to an amount which is smaller than the depth of focus, a change in the object side displacement amount does not appear as a change in the brightness of the point spread function or a change in the brightness of the image of the observed object.

In cases where there is a projection or recess on the surface of the observed object, the height of the projection or the depth of the recess corresponds to the object side displacement amount. Therefore, in the decentered state, in cases where the height of the projection or the depth of the recess on the surface of the observed object corresponds to an amount which is smaller than the depth of focus, a change of the projection or the recess on the surface of the observed object does not appear as a change in the brightness of the point spread function or a change in the brightness of the image of the observed object.

On the other hand, the point spread function at position P1 and the point spread function at position P3 are both displaced from the point spread function at position P2 by |Δ|. In this case, Δ is equal to two pixels. The direction of shift of the point spread function from point P2 to point P3 and the direction of shift of the point spread function from point P2 to point P1 are just opposite to each other. Therefore, in the decentered state, in the case where the object side displacement amount corresponds to an amount which is smaller than the depth of focus, a change in the object side displacement amount appears as a change in the position of the point spread function or a change in the position of the image of the observed object.

As described above, the object side displacement amount corresponds to the height of a projection or the depth of a recess. In the decentered state, in the case where the height of the projection or the depth of the recess corresponds to an amount which is smaller than the depth of focus, a change of the projection or the recess on the surface of the observed object appears as a change in the position of the point spread function or a change in the position of the image of the observed object. Therefore, in the decentered state, in the case where the height of the projection or the depth of the recess corresponds to an amount which is smaller than the depth of focus, it is possible to detect the height of the projection or the depth of the recess.

In the case where an image of an observed object is formed by an imaging optical system and the image is received by an image pickup element, it is necessary to consider the resolution of the imaging optical system and the resolution of the image pickup element. The system including the imaging optical system and the image pickup element will be referred to as the observation system.

In the case of a method that detects the object side displacement amount as a change in the brightness of an image of the observed object, the object side displacement amount cannot be detected, whether the system is an ordinary optical system as described above or a system in the decentered state, in the case where the object side displacement amount corresponds to an amount which is smaller than the depth of focus.

On the other hand, in the case of a method that detects a displacement of an image of the observed object, in the case where the object side displacement amount corresponds to an amount which is smaller than the depth of focus of the observation system, the object side displacement amount can be detected by a system in the decentered state, though it cannot be detected by the above-described ordinary optical system.

Moreover, in the case where the resolution of the imaging optical system is higher than the resolution of the image pickup element, the depth of focus of the observation system is larger than that in the case where the resolution of the imaging optical system is equal to the resolution of the image pickup element. Therefore, detection of a small object side displacement amount is more difficult than in the case where the resolution of the imaging optical system is equal to the resolution of the image pickup element.

However, in the decentered state, it is possible to detect a change in the position of the point spread function or a change in the position of the image of the observed object, if Δ is larger than one pixel as shown in FIGS. 2B, 2C, and 2D. Therefore, in the decentered state, it is possible to detect the object side displacement amount even in the case where the resolution of the imaging optical system is higher than the resolution of the image pickup element.

As described above, the object side displacement amount corresponds to the height of a projection or the depth of a recess. In the decentered state, in the case where the height of the projection or the depth of the recess corresponds to an amount which is smaller than the depth of focus, a change of the projection or the recess on the surface of the observed object appears as a change in the position of the point spread function or a change in the position of the image of the observed object.

Therefore, in the decentered state, it is possible to detect the height of the projection or the depth of the recess even in the case where the height of the projection or the depth of the recess corresponds to an amount which is smaller than the depth of focus and the resolution of the imaging optical system is higher than the resolution of the image pickup element.

Figure 3A:
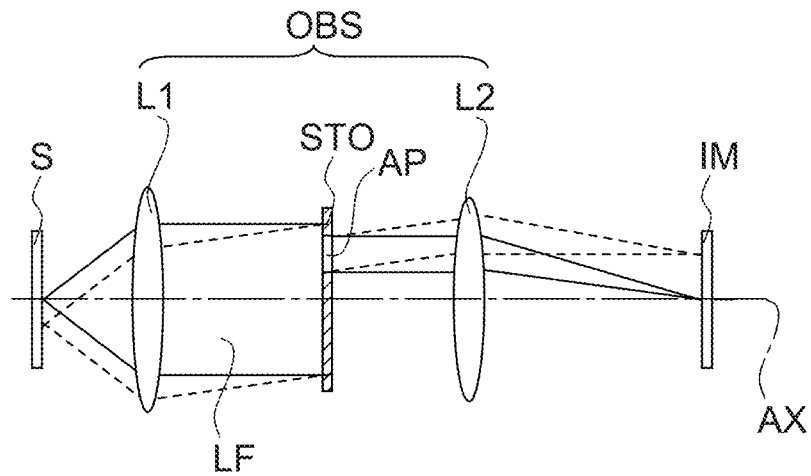
FIGS. 3A, 3B, and 3C show an exemplary optical system arrangement for establishing a decentered state, where
Figure 3B:
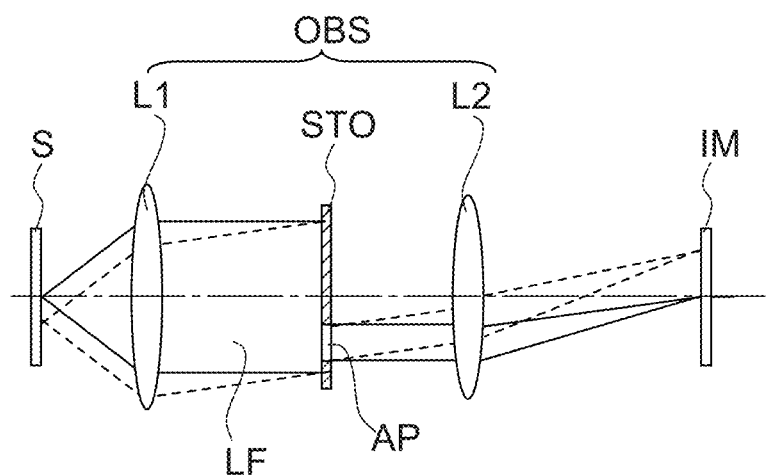
Figure 3C:
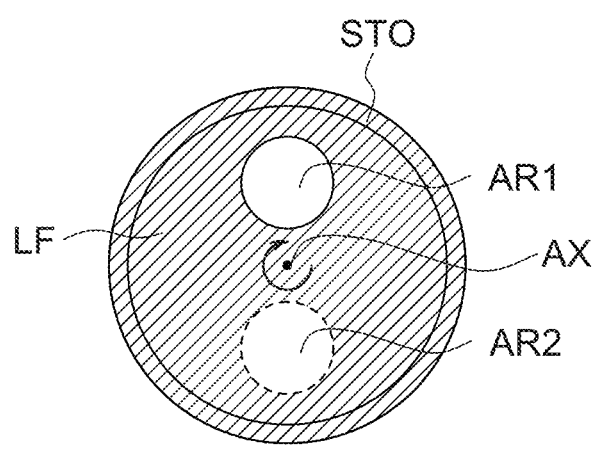

FIGS. 3A, 3B, and 3C show an exemplary optical system arrangement for establishing a decentered state, where FIG. 3A is a diagram showing light beams passing through the first area, FIG. 3B is a diagram showing light beams passing through the second area, and FIG. 3C is a diagram showing the first area and the second area.

The imaging optical system OBS includes a lens L1, a lens L2, and an aperture element STO. In the case where the imaging optical system OBS is the optical system of a microscope, the lens L1 is the objective lens, and the lens L2 is the tube lens. An observed object S is located on one side of the imaging optical system OBS, and an image pickup element IM is arranged on the other side of the imaging optical system. The image pickup element IM is arranged at a position at which the image of the observed object S is formed when the object side displacement amount is 0 (zero).

The aperture element STO is arranged at a location between the observed object S and the image of the observed object S. More specifically, the aperture element STO is arranged between the lens L1 and the lens L2. The shape of the aperture element STO is, but not limited to, circular. The aperture element STO has an aperture AP. The aperture AP is provided at a position away from the center of the aperture element STO. The shape of the aperture AP is, but not limited to, circular.

In FIGS. 3A and 3B, light from an axial object point is indicated by solid lines, and light from an off-axis object point is indicated by broken lines. The light from the axial object point and the light from the off-axis object point pass through the lens L1 and arrive at the aperture element STO. A portion of the light beams LF arriving at the aperture element STO pass through the aperture AP, and the other portion of the light beams is blocked by the aperture element STO. The light beams having passed through the aperture AP passes through the lens L2 and focused on the image pickup element IM. Consequently, an image of the observed object S is formed on the image pickup element IM.

In FIG. 3A, the aperture AP is located above the optical axis AX. On the other hand, in FIG. 3B, the aperture AP is located below the optical axis AX. Consequently, the first area AR1 and the second area AR2 are formed as shown in FIG. 3C.

The aperture element STO is provided with only one aperture AP. Therefore, the first area AR1 and the second area AR2 do not coexist at the same time. The first area AR1 and the second area AR2 are formed by setting the aperture element to two rotational positions respectively by rotating the aperture element STO about the optical axis AX.

In FIG. 3C, the position of the first area AR1 and the position of the second area AR2 are rotationally symmetric about the optical axis AX. However, the positions thereof are not required to be rotationally symmetric.

The position of the center of the aperture AP is away from the optical axis AX. Therefore, in the plane perpendicular to the optical axis AX of the imaging optical system OBS, the position of the center of the first area AR1 and the position of the center of the second area AR2 are also away from the optical axis AX.

In the case where the shape of the first area is circular, the position of the center of the first area is the center of the circle. In the case where the shape of the first area is a regular polygon, the position of the center of the first area is the center of the circle inscribed in the polygon or the center of the circle circumscribing the polygon. In the case where the shape of the first area is axial symmetric about two axes intersecting at right angles, the position of the center of the first area is the point of intersection of the two axes. Alternatively, the position of the centroid of the first area may be regarded as the center of the first area. The position of the center of the second area may be regarded in the same manner as the position of the center of the first area.

Moreover, the diameter of the aperture AP is smaller than the radius of the aperture element STO, and the optical axis AX does not intersect the aperture AP. Therefore, the first area AR1 and the second area AR2 do not overlap with each other. The diameter of the aperture AP may be so large that the optical axis AX intersects the aperture AP. In this case also, the first area and the second area respectively include at least portions that do not overlap with each other, because the position of the center of the aperture AP is away from the optical axis AX.

Moreover, the apparatus may be provided with an illumination optical system arranged at a position opposite to the imaging optical system OBS with the observed object S between, and the aperture element STO may be provided in the illumination optical system. In this case also, the position of the center of the aperture AP is arranged away from the optical axis of the illumination optical system. Hence, in the plane perpendicular to the optical axis of the illumination optical system, the position of the center of the first area AR1 and the position of the center of the second area AR2 are away from the optical axis of the illumination optical system.

It is preferred that the aperture element STO be arranged at a position that allows both light from the axial object point and light from the off-axis object points to pass through the aperture element STO. Such positions include the position of the pupil of the imaging optical system OBS and the position conjugate with the pupil. The aperture element STO may be located at the position of the pupil of the illumination optical system or the position conjugate with the pupil of the illumination optical system. The position of the pupil of the illumination optical system can be regarded to be conjugate with the pupil of the imaging optical system.

The position of the aperture element STO is not required to coincide strictly with the position of the pupil or the position conjugate with the pupil. Since there are aberrations of pupil relay of the optical system, the aperture element STO may be arranged in the neighborhood of the position of the pupil or in the neighborhood of the position conjugate with the pupil.

If the aperture element STO is arranged at the position of the pupil of the imaging optical system OBS, the decentered state is established. As shown in FIGS. 2B and 2D, in the decentered state, even in the case where the object side displacement amount corresponds to an amount which is smaller than the depth of focus, the image of the observed object S shifts in the plane perpendicular to the optical axis AX by Δ. As the aperture element STO is rotated about the optical axis AX, the shift direction of the image of the observed object S changes depending on the position of the aperture AP.

The aperture AP is shifted to a first position to generate light beams passing through the first area, and an image of a first optical image is captured. Then, the aperture AP is shifted to a second position different from the first position to generate light beams passing through the second area, and an image of a second optical image is captured.

Figure 4A:
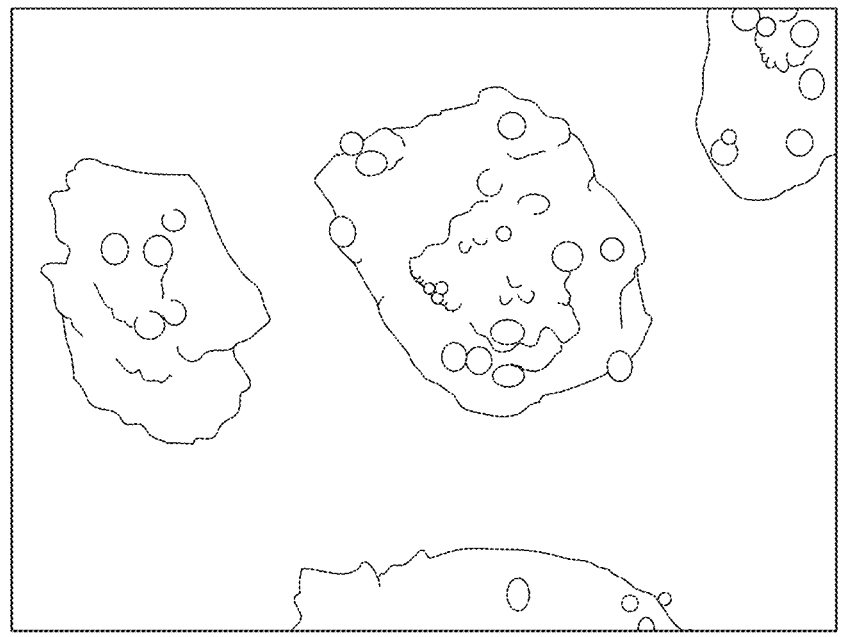
FIGS. 4A and 4B shows exemplary images, where
Figure 4B:
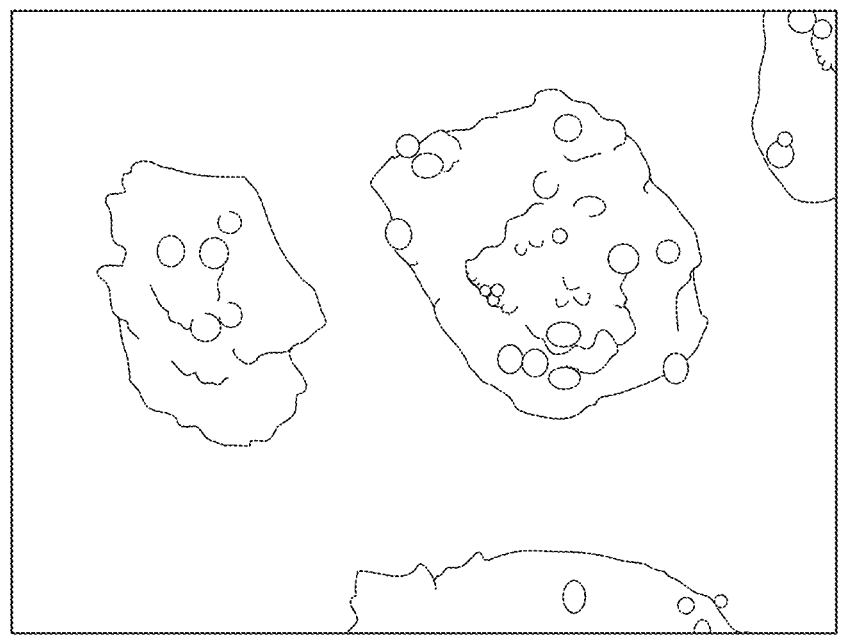

FIGS. 4A and 4B shows exemplary images, where FIG. 4A shows a first image, and FIG. 4B shows a second image. The first and second images are images when observing the same observed object by fluorescent observation. The observed object is an aggregate of cells. In FIGS. 4A and 4B, contours of the aggregate of cells are drawn by lines.

The first and second images shown in FIGS. 4A and 4B are captured by shifting the aperture AP to two positions that are rotationally symmetric about the optical axis AX. In the case where the position of the first area AR1 and the position of the second area AR2 are rotationally symmetric about the optical axis AX, the first and second images respectively have image displacements that are equal to each other in their absolute values and opposite to each other in their directions. The amount of displacement in the image corresponds to the object side displacement amount. Thus, three-dimensional position information about the observed object S is included in both the image of the first optical image and the image of the second optical image.

The three-dimensional position information acquiring method and the three-dimensional position information acquiring apparatus according to the embodiment will be described. The three-dimensional position information acquiring method according to the embodiment includes acquiring an image of a first optical image, acquiring an image of a second optical image after acquiring the image of the first optical image, and performing a predetermined computation using image data of the first optical image and image data of the second optical image, wherein acquisition of the image of the first optical image is performed based on light beams having passed through a first area, acquisition of the image of the second optical image is performed based on light beams having passed through a second area, the position of the center of the first area and the position of the center of the second area are both away from the optical axis of an optical system in a plane perpendicular to the optical axis of the optical system, the first area and the second area respectively include at least portions that do not overlap with each other, and three-dimensional position information about an observed object is acquired by the predetermined computation.

Figure 5:
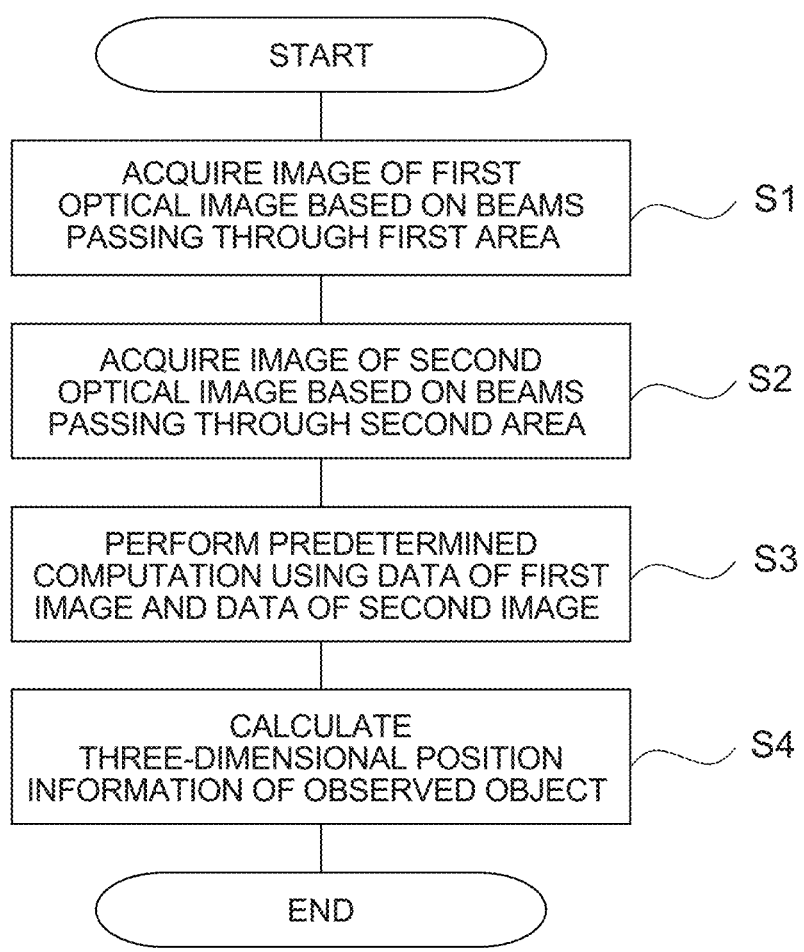
FIG. 5 is a flow chart of a three-dimensional position information acquiring method according to an embodiment.

FIG. 5 is a flow chart of the three-dimensional position information acquiring method of this embodiment. Step S1 is the step of acquiring the image of the first optical image. In the step of acquiring the image of the first optical image, an image of the first optical image is acquired. This acquisition is performed based on light beams having passed through the first area among the light beams from points on the observed object.

Step S2 is the step of acquiring the image of the second optical image. The step of acquiring the image of the second optical image is executed after the step of acquiring the image of the first optical image is executed. In the step of acquiring the image of the second optical image, an image of the second optical image is acquired. This acquisition is performed base on light beams having passed through the second area among the light beams from points on the observed object.

In the three-dimensional position information acquiring method of this embodiment, the position of the center of the first area and the position of the center of the second area are both away from the optical axis in the plane perpendicular to the optical axis of the optical system. Moreover, the first area and the second area respectively include at least portions that do not overlap with each other. Therefore, the center of the first area and the center of the second area both do not coincide with the optical axis of the optical system.

Thereafter, step S3 is executed. Step S3 is the step of performing the predetermined computation. The predetermined computation uses data of first image (i.e. image data of the first optical image) and data of second image (i.e. image data of the second optical image). The three-dimensional position information about the observed object S is included in both the image of the first optical image and the image of the second optical image. Thus, the three-dimensional position information about the observed object S is acquired by the predetermined computation.

According to the three-dimensional position information acquiring method of this embodiment, even in the case where an amount of displacement of the observed object from the in-focus position of the optical system corresponds to an amount which is smaller than the depth of focus of the optical system, since this amount of displacement can be detected efficiently, it is possible to acquire the three-dimensional position information with high resolution.

Moreover, in the three-dimensional position information acquiring method according to this embodiment, it is preferable that the first area and the second area are formed at rotationally symmetrical positions.

In the case where the aperture AP is shifted to two positions that are rotationally symmetric about the optical axis AX, the first area AR1 and the second area AR2 are formed at rotationally symmetric positions. In this case, the first image and second image respectively have image displacements that are equal to each other in their absolute values and opposite to each other in their directions. Consequently, it becomes easy to perform processing in the predetermined computation, for example, processing of calculating the amount of displacement from the in-focus position.

Moreover, in the three-dimensional position information acquiring method according to this embodiment, it is preferable that the predetermined computation performs subtraction processing using data of the first image and data of the second image and a subtracted image is generated by the subtraction processing.

Figure 6:
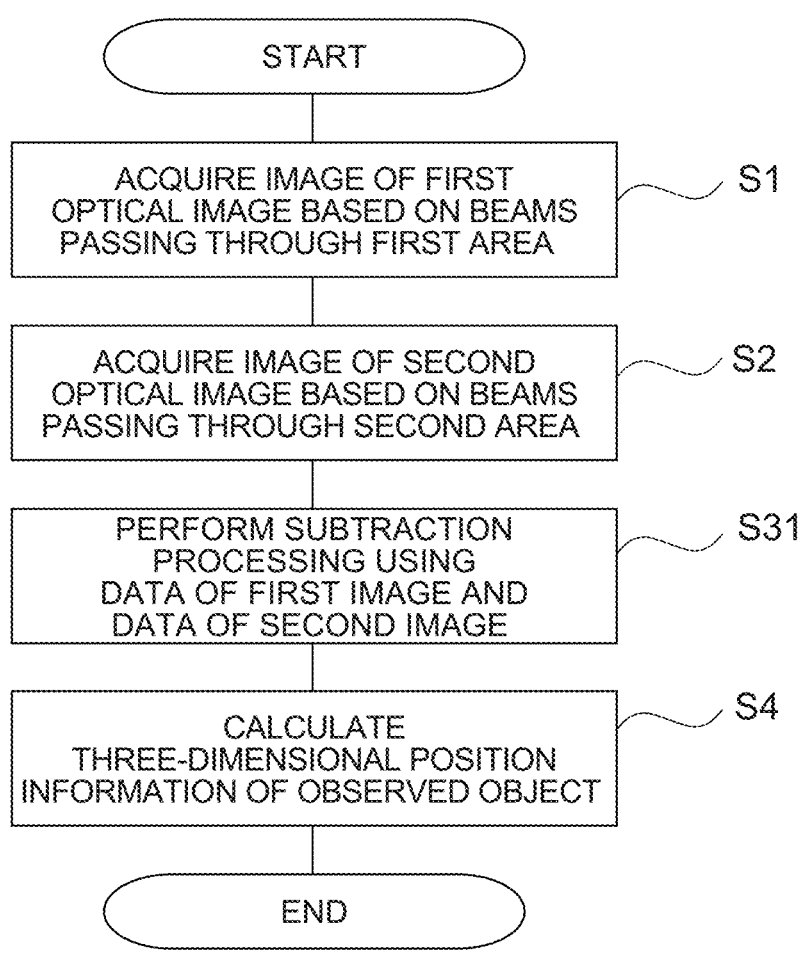
FIG. 6 is a flow chart of a three-dimensional position information acquiring method according to an embodiment.

FIG. 6 is a flow chart of the three-dimensional position information acquiring method according to the embodiment. The steps same as those in FIG. 5 are denoted by the same reference numerals and will not be described further. Step S31 is the step of performing subtraction processing. In the step of performing subtraction processing, subtraction processing using data of the first image and data of the second image is performed to generate a subtracted image.

The first image and the second image are the same image with a transverse displacement of +Δ and a transverse displacement of −Δ respectively. Therefore, the subtracted image is a differential image of the observed object with a displacement of Δ. A differential image of the observed object is generated by the above-described subtraction processing. The image contrast of this differential image is expressed as a function of Δ as with the image contrast in differential interference contrast microscopes, which is expressed as a function of the shear amount (the difference between two polarizations) $Δ_{DIC}$.

In the following, two methods for calculating three-dimensional position information of the observed object from a subtracted image will be described by way of example.

The first method of calculating three-dimensional position information will be described. In the portion of the subtracted image in which the image contrast is zero, Δ is equal to zero. This means that the object side displacement amount δz is zero in this portion. Then, the following tree images are prepared: (I) the subtracted image as it is; (II) an image as the absolute value of the subtracted image; and (III) an image obtained by applying a Sobel filter to the subtracted image.

Then, a pixel area in which the pixel values of the three images are close to zero is extracted. By doing this, it is possible to extract points which coincide with the in-focus position of the imaging optical system from among points of the observed object.

Therefore, it is possible to acquire the three-dimensional position information of the observed object by changing the position of the observed object and the position of the imaging optical system relatively and performing the following processing (i) to (iii) repeatedly at different positions: (i) capturing the first image and the second image; (ii) subtraction processing; and (iii) selecting at least one of the three images and extracting a pixel area in which the pixel values of the selected image are close to zero.

As just described, with the first method, it becomes available to acquire position information with respect to the optical axis direction with higher accuracy as compared to conventional methods that acquire position information from the image contrast.

Next, the second method of calculating three-dimensional position information will be described. In the first method, the three-dimensional position information about the observed object is acquired by extracting a portion in which Δ is equal to zero. However, the object side displacement amount and the amount of shift of the point spread function correspond uniquely to each other. Therefore, it is possible to convert the amount of shift of the point spread function into the object side displacement amount.

Figure 7:
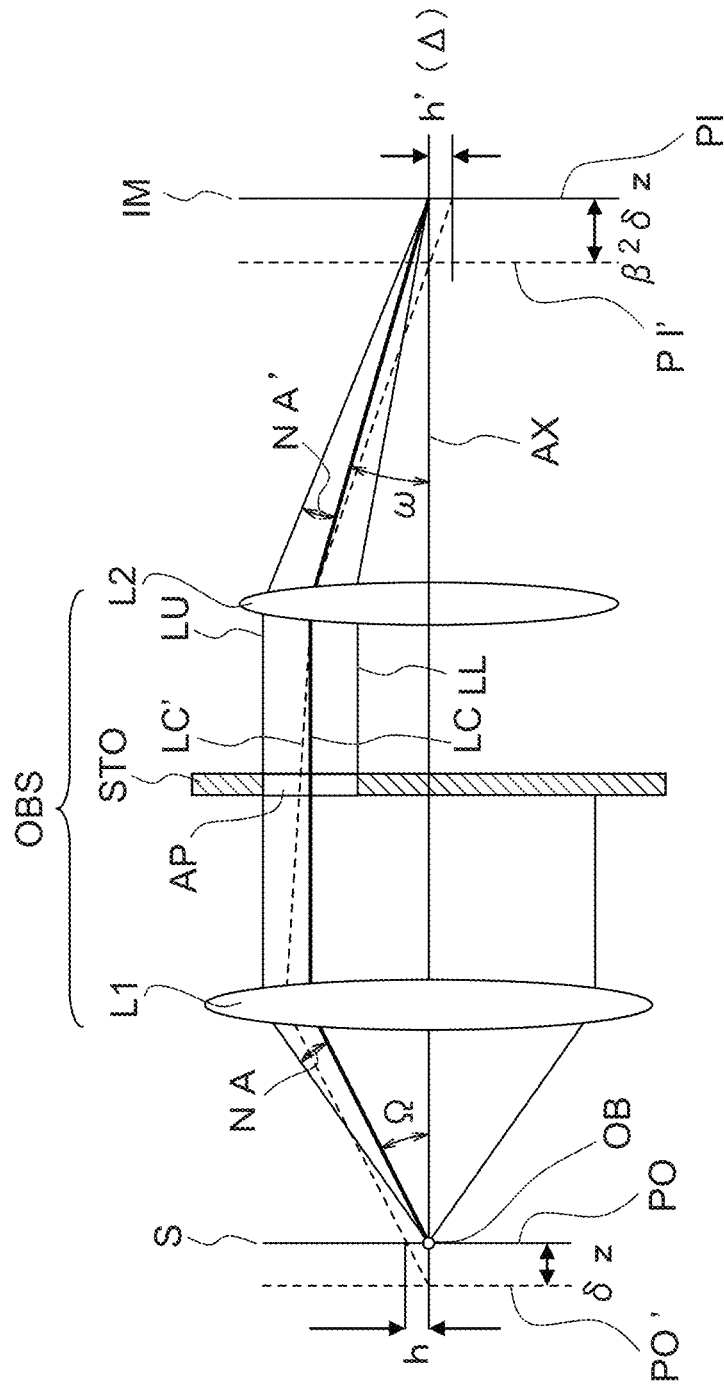
FIG. 7 is a diagram illustrating the second method for calculating height information.

FIG. 7 is a diagram illustrating the second method for calculating height information. The components the same as those in FIG. 3A are denoted by like reference numerals and will be not described further. As shown in FIG. 7, as the aperture element STO is arranged at the pupil position of the imaging optical system OBS, only the light beams from the observed object S that have passed through the aperture AP are incident on the image pickup element IM.

In FIG. 7, the position PO is the in-focus position of the imaging optical system OBS. The position PO' is a position displaced from the in-focus position of the imaging optical system OBS. The distance δz between the position PO and the position PO' is the object side displacement amount.

In FIG. 7, the rays LC, LU, and LL are rays coming from the position PO. The ray LC is the center ray of the rays passing through the aperture AP. The ray LU is the ray that passes through the point most distant from the optical axis AX among the rays passing through the aperture AP. The ray LL is the ray that passes through the point closest to the optical axis AX among the rays passing through the aperture AP. Ray LC' is a ray coming from the position PO'. The ray LC' is the center ray of the rays passing through the aperture AP.

NA is the object side numerical aperture of the imaging optical system OBS, and NA' is the image side numerical aperture of the imaging optical system OBS. The numerical aperture NA is determined by the angle formed by the ray LU and the ray LC incident on the lens L1. The numerical aperture NA' is determined by the angle formed by the ray LU and the ray LC emerging form the lens L2. In FIG. 7, Q is the angle formed by the ray LC incident on the lens L1 and the optical axis AX, and co is the angle formed by the ray LC emerging from the lens L2 and the optical axis AX.

The position PI is a position conjugate with the position PO. The image pickup element IM is arranged at the position PI. The position PI' is apposition conjugate with the position PO'. The position PI' is displaced from the image position PI. The distance between the position PI and the position PI' is the image side displacement amount, which is equal to $β^2δz$, where β is the magnification of the imaging optical system OBS.

In the case where the position of the observed object S coincides with the position PO, there is no displacement between the position of the observed object Sand the in-focus position of the imaging optical system OBS. In this case, light from the observed object S is focused at the position PI as shown by the rays LU, LC, and LL. On the other hand, in the case where the position of the observed object S coincides with the position PO', there is a displacement between the position of the observed object S and the in-focus position of the imaging optical system OBS. In this case, light from the observed object S is focused at the position PI', as shown with ray LC'.

At the position PO, the ray LC from the observed object S is incident on the imaging optical system OBS at angle Q. Here, if the observed object S is shifted away from the imaging optical system OBS by distance δz, the ray LC from the observed object S changes into the ray LC'. At the position PO, the ray LC' passes through a point away from the optical axis AX by "h". The h is expressed by the following equation (5):

$$h = δz × \tan Ω \qquad (5),$$

where
h is the height of the ray LC' at the position PO.

As will be seen from equation (5), displacement δz of the observed object S is equivalent to a shift of the object point OB at the position PO in a direction perpendicular to the optical axis AX by h.

After passing through the imaging optical system OBS, the ray LC' intersects the optical axis AX at the position PI' and reaches the position PI. The image pickup element IM is arranged at the position PI. The position of incidence of the ray LC' on the image pickup element IM is away from the optical axis AX by "h'". The h' is expressed by the following equation (6):

$$h' = β × h = β × δz × \tan Ω \qquad (6),$$

where
h' is the height of the ray LC' at the position PI.

This equation (6) holds even in the case where the image side displacement $β^2δz$ is smaller than the depth of focus of the imaging optical system OBS. Since h'=Δ, equation (6) can be changed into the following equation (7):

$$Δ = β × δz × \tan Ω \qquad (7),$$

where

Δ is the amount of displacement of the point spread function in the plane perpendicular to the optical axis.

Therefore, if the value of Δ at a certain pixel on the image pickup element IM can be determined, it is possible to determine the value of δz at the position on the observed object S corresponding to that pixel. Consequently, it is possible to acquire three-dimensional information (x, y, δz) of the observed object S.

It is possible to determine a relative shift of an image of the observed object S (or point spread function) from the first image and the second image by the phase only correlation method. However, it is not possible to determine the direction of shift of one image to the other by phase only correlation. In consequence, it is not possible to determine whether the observed object S is on the front side or on the rear side relative to the in-focus position by phase only correlation.

In contrast, in the three-dimensional position information acquiring method according to this embodiment, it is possible to determine the direction of shift of one image relative to the other. In the first image and the second image, information of the shift amount and the shift direction of the image of the observed object S are included. Therefore, subtraction processing is performed using data of the first image and data of the second image, and thereby a subtracted image is generated.

In the first image and the second image, information of the shift direction of the image of the observed object S is included. Therefore, in the subtracted image, contrast of the image varies depending on the shift direction of the image of the observed object S. The shift direction of the image of the observed object S varies depending on the direction of displacement of the observed object S relative to the in-focus position of the imaging optical system OBS. Therefore, it is possible to determine whether the observed object S is displaced on the front side or on the rear side relative to the in-focus position by determining the shift amount and the shift direction of the image of the observed object S from the variation in the image contrast of the subtracted image.

As just described, it is possible to acquire the three-dimensional information (x, y, δz) of the observed object S as the object side displacement amount by analyzing the image contrast of the subtracted image. Moreover, in the case where the object side displacement amount corresponds to an amount which is larger than the depth of focus of the imaging optical system OBS, the relative distance between the observed object S and the imaging optical system OBS may be changed. In other words, scanning may be performed in the direction along the optical axis. By doing this, it becomes available to acquire the three-dimensional position information even in the case where the object side displacement amount corresponds to an amount which is larger than the depth of focus of the imaging optical system OBS.

Moreover, in the three-dimensional position information acquiring method according to this embodiment, it is preferable that the predetermined computation performs Fourier transform for the subtracted image.

Figure 8:
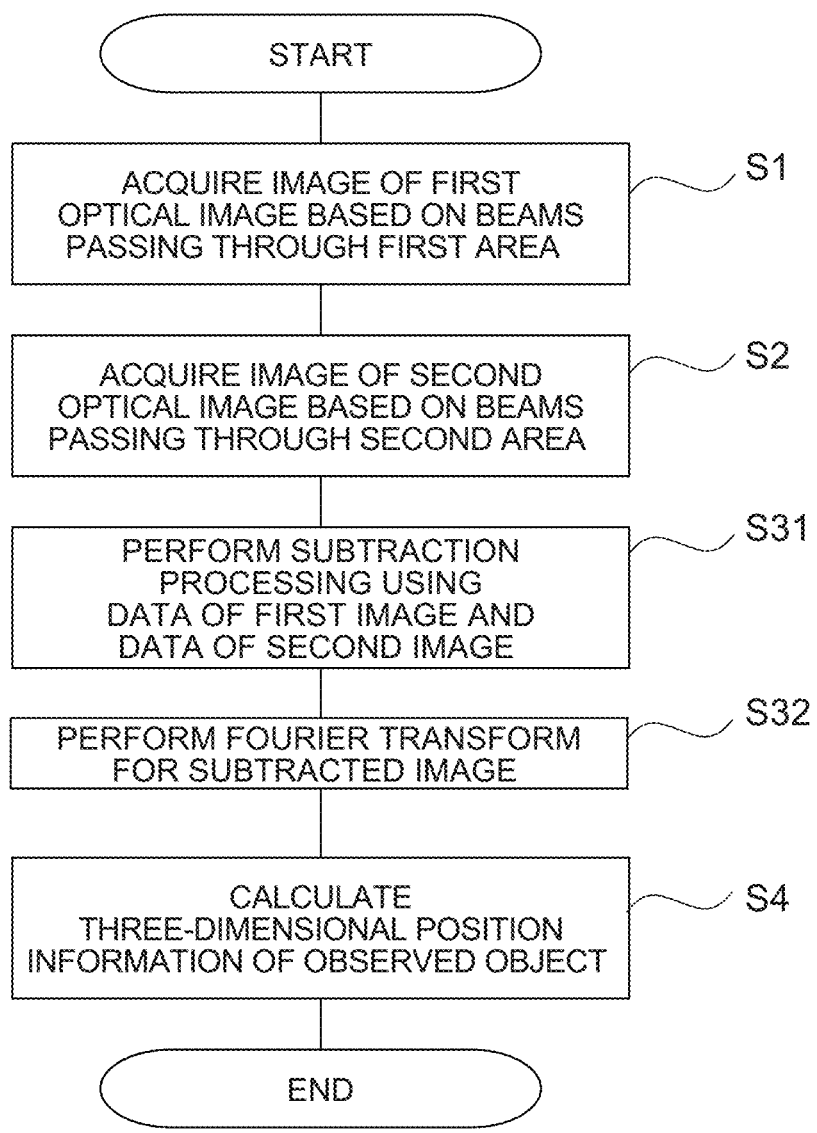
FIG. 8 is a flow chart of a three-dimensional position information acquiring method according to an embodiment.

FIG. 8 is a flow chart of the three-dimensional position information acquiring method according to this embodiment. The steps same as those in FIG. 6 are denoted by the same reference numerals and will not be described further. Step S32 is the step of performing Fourier transform for the subtracted image.

Here, a case in which the observed object is a fluorescent specimen will be described by way of example. For the sake of simplicity of description, one-dimensional model is used. The intensity distribution of a fluorescent image of the observed object is expressed by the following equation (8):

$$I(x)=\int_{-\infty}^{\infty} M(f_x)O(f_x)\exp\{-2\pi i f_x(x)\}df_x \quad (8),$$

where $f_x$ is the spatial frequency, $I(x)$ is the intensity distribution of the fluorescent image, $M(f_x)$ is the transfer function of the imaging optical system, and $O(f_x)$ is the Fourier transform of the fluorescent light emission distribution $o(x)$.

When subtraction is performed by using the first image and the second image, the image intensity distribution in the subtracted image is expressed by the following equation (9):

$$\begin{aligned}I_{+\Delta}(x) - I_{-\Delta}(x) &= \int_{-\infty}^{\infty} M(f_x)O(f_x)\exp(-2\pi i f_x(x+\Delta))df_x - \\ &\quad \int_{-\infty}^{\infty} M(f_x)O(f_x)\exp(-2\pi i f_x(x-\Delta))df_x \\ &= \int_{-\infty}^{\infty} \{\exp(-2\pi i f_x\Delta) - \\ &\quad \exp(2\pi i f_x\Delta)\}M(f_x)O(f_x)\exp(-2\pi i f_x x)df_x \\ &= -2i\int_{-\infty}^{\infty} \sin(2\pi\Delta f_x)M(f_x)O(f_x)\exp(-2\pi i f_x x)df_x,\end{aligned} \quad (9)$$

where $I_{+\Delta}(x)$ is the image intensity distribution of the first image, and $I_{-\Delta}(x)$ is the image intensity distribution of the second image.

Moreover, addition is performed by using the first image and the second image, the image intensity distribution in the sum image is expressed by the following equation (9):

$$\begin{aligned}I_{+\Delta}(x) + I_{-\Delta}(x) &= \int_{-\infty}^{\infty} M(f_x)O(f_x)\exp(-2\pi i f_x(x+\Delta))df_x + \\ &\quad \int_{-\infty}^{\infty} M(f_x)O(f_x)\exp(-2\pi i f_x(x-\Delta))df_x \\ &= \int_{-\infty}^{\infty} \{\exp(-2\pi i f_x\Delta) + \\ &\quad \exp(2\pi i f_x\Delta)\}M(f_x)O(f_x)\exp(-2\pi i f_x x)df_x \\ &= 2\int_{-\infty}^{\infty} \cos(2\pi\Delta f_x)M(f_x)O(f_x)\exp(-2\pi i f_x x)df_x.\end{aligned} \quad (10)$$

The image intensity distribution of the subtracted image and the image intensity distribution of the sum image are both performed Fourier transform. The intensity distributions after performing Fourier transform are expressed by the following equations (11) and (12) respectively. In the following equations, F[ ] is a operator representing the Fourier transform.

$$F[I_{+\Delta}(x)_{-\Delta}(x)]=-2i\,\sin(2\pi\Delta f_x)M(f_x)O(f_x) \quad (11)$$

$$F[I_{+\Delta}(x)+I_{-\Delta}(x)]=2\,\cos(2\pi\Delta f_x)M(f_x)O(f_x) \quad (12)$$

By performing Fourier transform for the subtracted image, the three dimensional position information is expressed by trigonometric functions. Thus, it is possible to acquire the three dimensional position information easily.

Moreover, in that the three dimensional position information acquiring method according to this embodiment, it is preferable to include dividing the subtracted image into a plurality of measurement areas, and performing Fourier transform for the subtracted image within the measurement area, in each of the measurement areas, and Fourier coefficients are calculated in each of the measurement areas by the Fourier transform.

Figure 9:
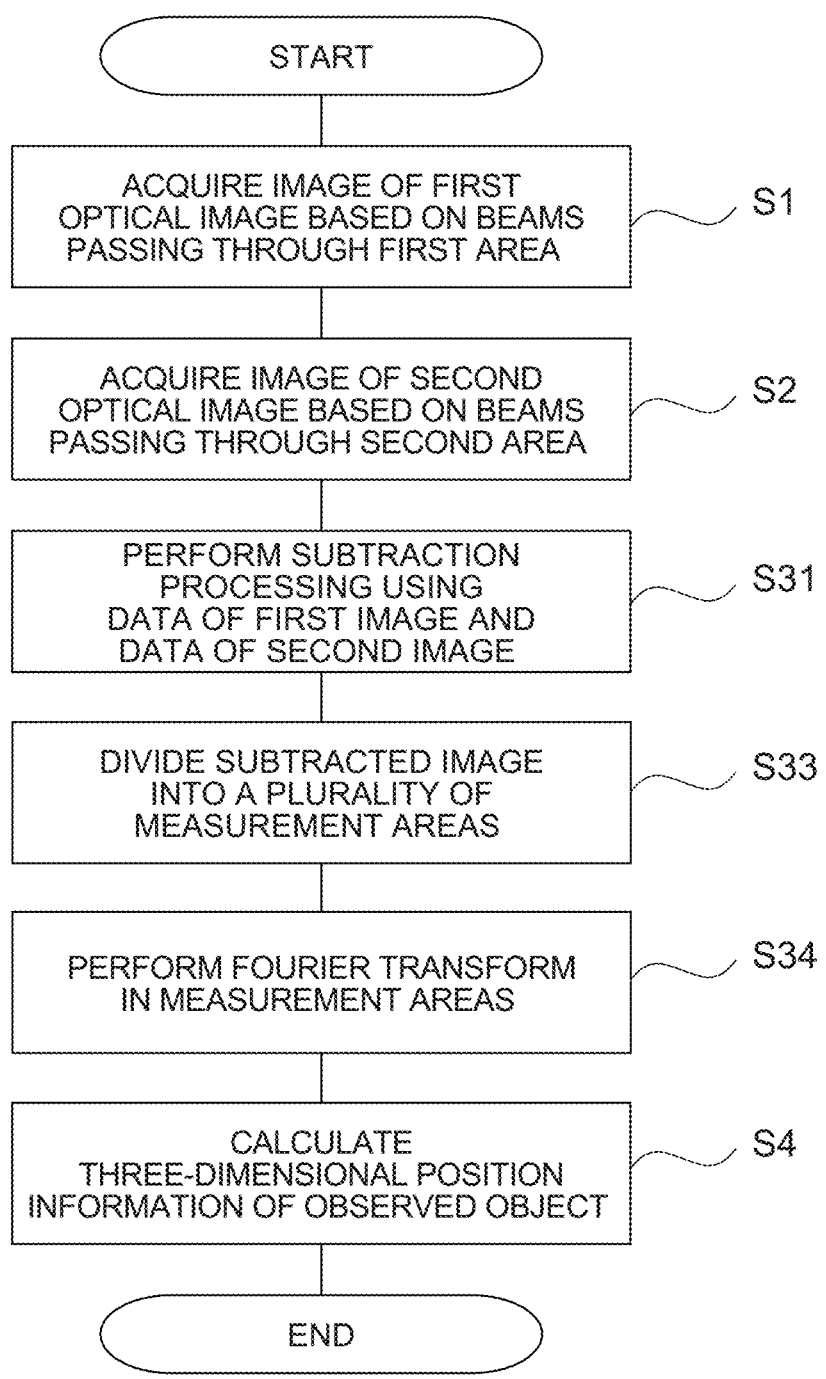
FIG. 9 is a flow chart of a three-dimensional position information acquiring method according to an embodiment.

FIG. 9 is a flow chart of the three-dimensional position information acquiring method according to the embodiment. The steps same as those in FIG. 5 are denoted by the same reference numerals and will not be described further. Step S33 is the step of dividing the subtracted image into a plurality of measurement areas. Step S34 is the step of performing Fourier transform for the subtracted image within the measurement area, in each of the measurement areas.

Figure 10:
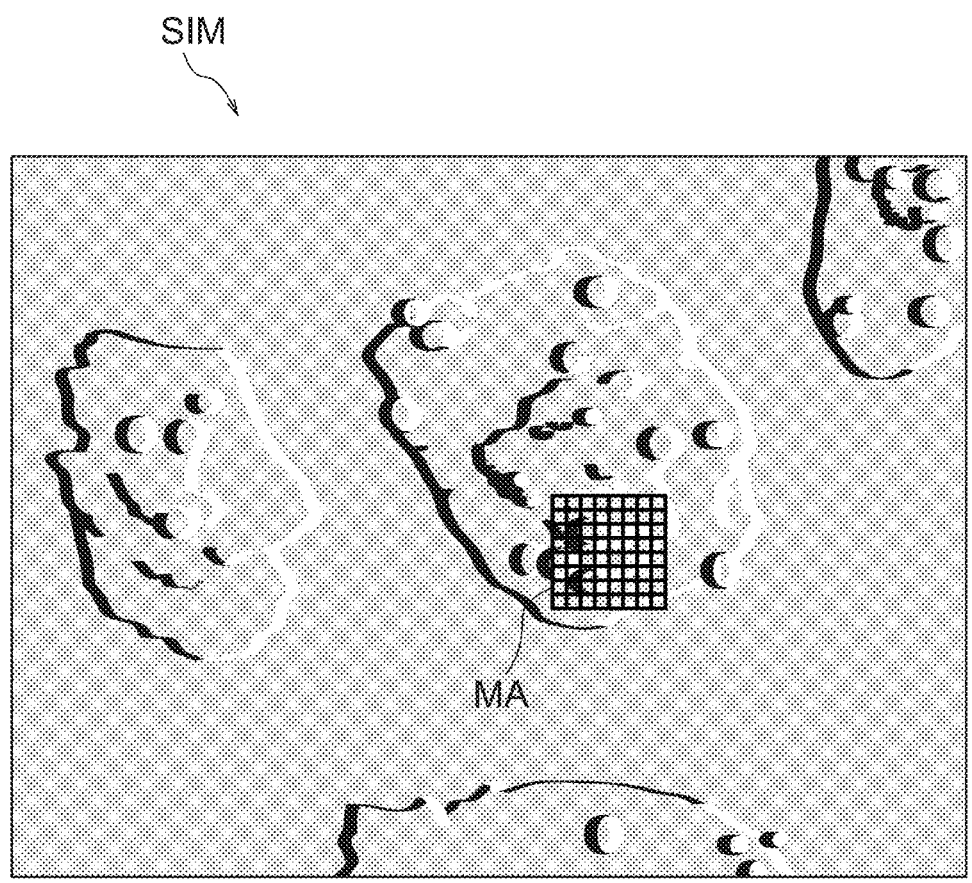
FIG. 10 is a diagram showing an exemplary measurement area.

In FIG. 10, an exemplary measurement area is shown. The subtracted image SIM is an image of a plurality of aggregates of cells. In the three-dimensional position information acquiring method according to the embodiment, the subtracted image SIM is divided into a plurality of measurement areas. FIG. 10 shows one of the divided measurement areas MA. The Fourier transforms are performed for this measurement area MA according to equations (11) and (12). Fourier coefficients are calculated in the measurement area MA by the Fourier transforms.

In the three-dimensional position information acquiring method according to the embodiment, the measurement area MA is set at an arbitrary position in the subtracted image SIM, and Fourier transform is performed for the subtracted image which is within the measurement area set at that position. Then, the measurement area MA is shifted to another position, and the subtracted image is Fourier transform is performed for the subtracted image which is within the measurement area MA at the shifted position. The shift of the measurement area MA and the Fourier transform in the measurement area MA at the shifted position are performed repeatedly. By doing this, the effect same as dividing the subtracted image into a plurality of measurement areas can be achieved.

It is possible to improve the resolution in the X-Y plane by dividing the subtracted image into a plurality of measurement areas and shifting the measurement areas in the subtracted image in a scanning manner. Consequently, it is possible to acquire the three-dimensional position information with high resolution.

Moreover, in the three-dimensional position information acquiring method according to the embodiment, it is preferable to include extracting Fourier coefficients in a predetermined spatial frequency band form among Fourier coefficients, and the three-dimensional position information is calculated for a region of the observed object corresponding to the measurement area, using the extracted Fourier coefficients.

Figure 11:
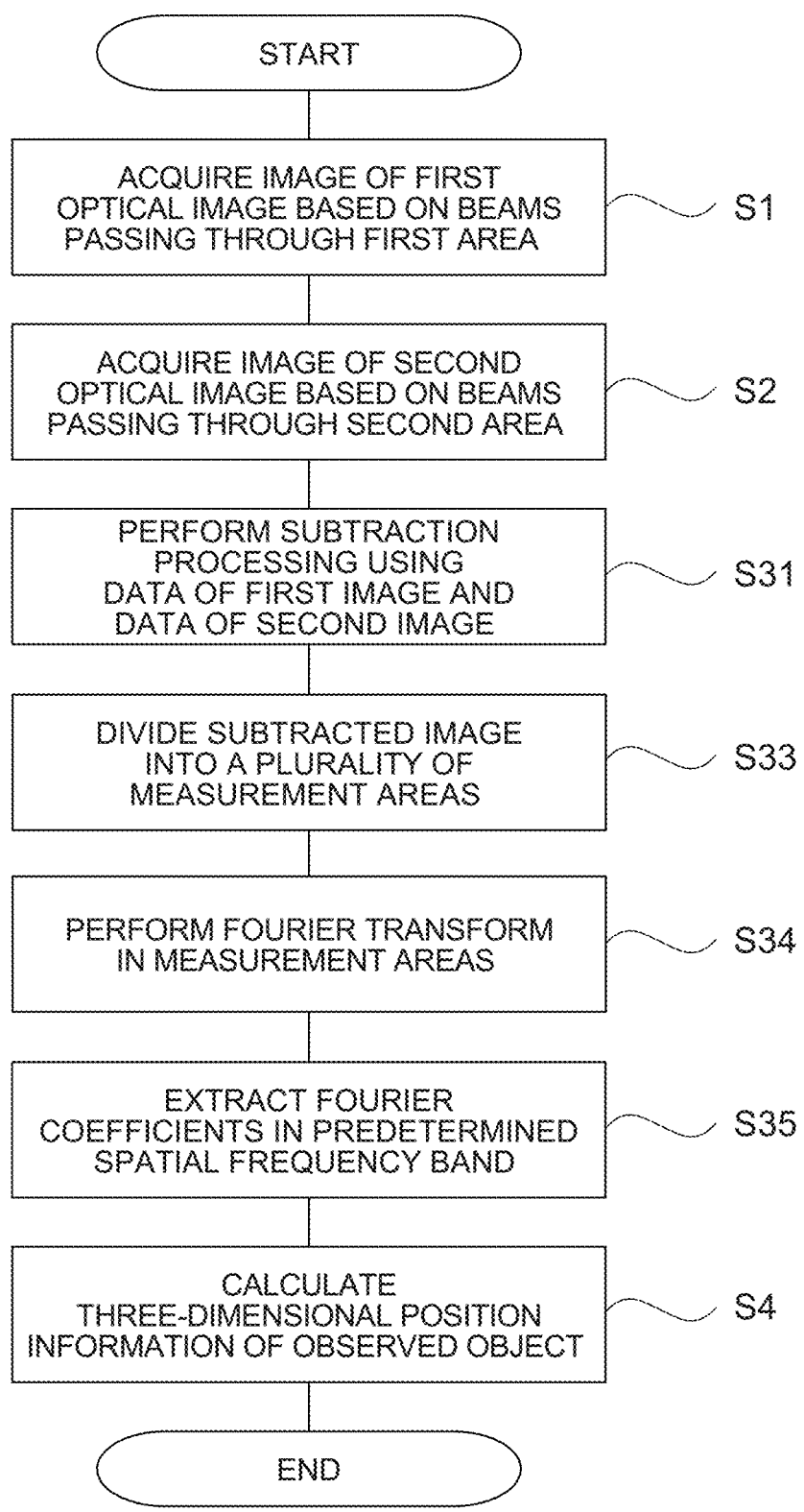
FIG. 11 is a flow chart of a three-dimensional position information acquiring method according to an embodiment.

FIG. 11 is a flow chart of the three-dimensional position information acquiring method according to the embodiment. The steps same as those in FIG. 9 are denoted by the same reference numerals and will not be described further. Step S35 is the step of extracting Fourier coefficients in a predetermined spatial frequency band form among Fourier coefficients. In step S35, Fourier coefficients within the predetermined spatial frequency band are extracted form among Fourier coefficients, and the three dimensional position information is calculated for a region of the observed object corresponding to the measurement area, using the extracted Fourier coefficients.

Fourier coefficients are obtained by performing the Fourier transform. Following equation (13) is obtained by taking the ratio of the imaginary part Im{ } of equation (11) and the real part Re{ } of equation (12):

$$\frac{\mathrm{Im}\{F[I_{+\Delta}(x) - I_{-\Delta}(x)]\}}{\mathrm{Re}\{F[I_{+\Delta}(x) + I_{-\Delta}(x)]\}} = \tan(2\pi \Delta f_x). \tag{13}$$

Equation (13) expresses the ratio of the Fourier coefficients in the subtracted image and the Fourier coefficients in the sum image. The following equation (14) is obtained by taking the arctangent of equation (13):

$$\tan^{-1}\left\{\frac{\mathrm{Im}\{F[I_{+\Delta}(x) - I_{-\Delta}(x)]\}}{\mathrm{Re}\{F[I_{+\Delta}(x) + I_{-\Delta}(x)]\}}\right\}/2\pi = \Delta f_x. \tag{14}$$

As just described, $\Delta f_x$ can be approximately calculated from pixel values of the spectrum image after performing the Fourier transform (i.e. image in the Fourier space) by equation (14). In equation (14), $\Delta$ is a value expressed in units of the number of pixels. On the other hand, the object side displacement amount is a value expressed by in units of length. Since the size of one pixel of the image pickup element is expressed in units of length such as μm (micrometers), it is possible to determine the object side displacement amount in units of length from the pixel size and the number of pixels.

After performing the Fourier transform for the image in the measurement area, Fourier coefficients in the measurement area are obtained. Each pixel within the measurement area may contain various noise components including electrical noises. Since the noise components included in the respective pixels are independent from each other, noises are largely included in high spatial frequency components after performing the Fourier transform. On the other hand, the effect of noises is small in low spatial frequency components. Therefore, the effect of noises can be reduced by calculating the value of $\Delta$ using low spatial frequency components.

Therefore, a predetermined spatial frequency band is set, and Fourier coefficients in the predetermined spatial frequency band is extracted. By setting the spatial frequency band to a band close to zero, it is possible to extract Fourier coefficients for low spatial frequencies. Consequently, it is possible to acquire accurate three-dimensional position information with small noises.

Moreover, in the three-dimensional position information acquiring method according to the embodiment, it is preferable to include approximating the extracted Fourier coefficients by a straight line, and calculating the gradient of the approximated straight line and, the three-dimensional position information of the observed object is calculated from the gradient of the approximated straight line.

Figure 12:
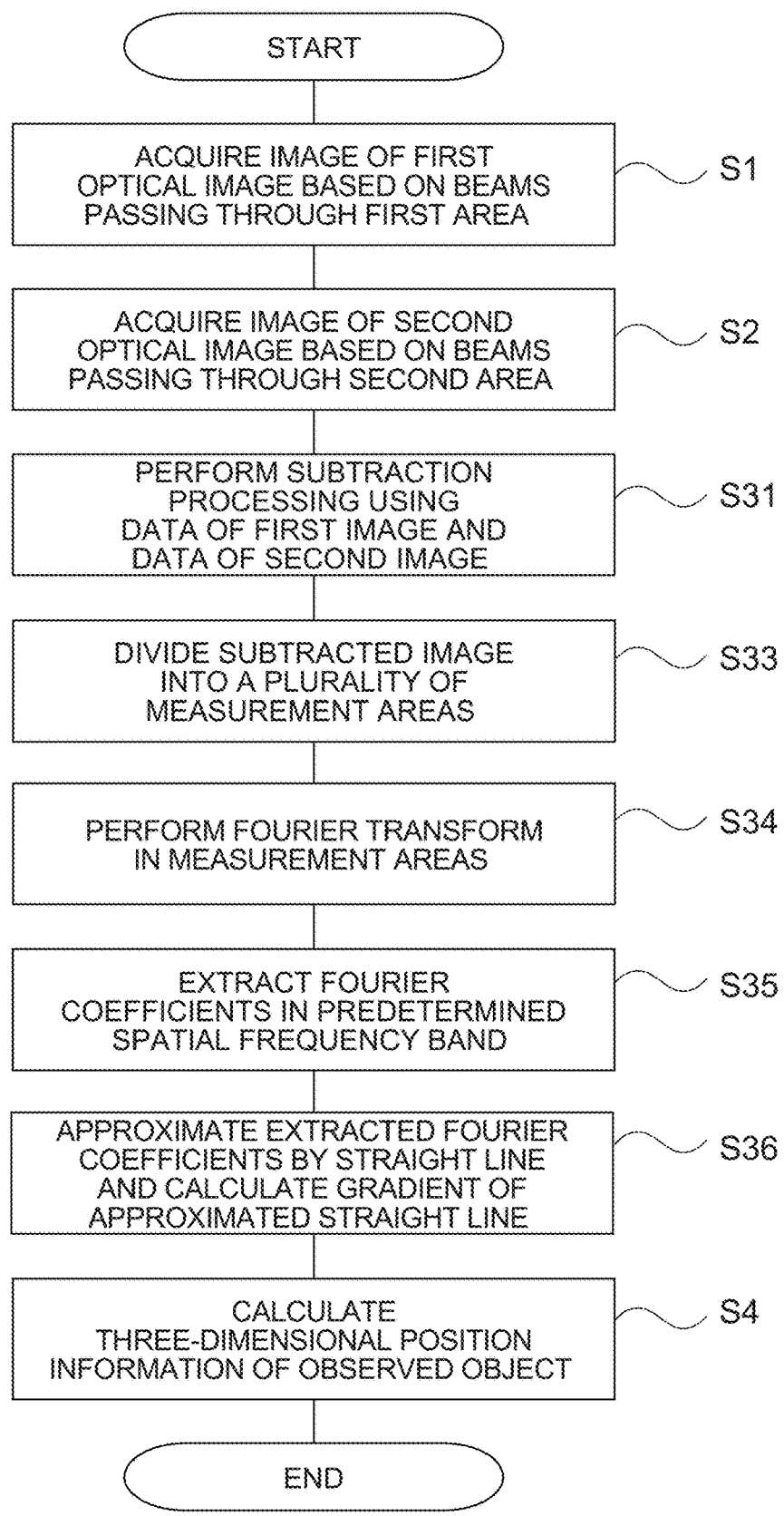
FIG. 12 is a flow chart of a three-dimensional position information acquiring method according to an embodiment.

FIG. 12 is a flow chart of the three-dimensional position information acquiring method according to the embodiment. The steps same as those in FIG. 11 are denoted by the same reference numerals and will not be described further. Step S36 is the step of approximating the extracted Fourier coefficient by a straight line and calculating the gradient of the approximated straight line. In step S36, the extracted Fourier coefficients are approximated by a straight line, and three-dimensional position information of the observed object is calculated from the gradient of the approximated straight line.

An example of this approximation by a straight line will be described with reference to FIGS. 13A, 13B, and 14.

Figure 13A:
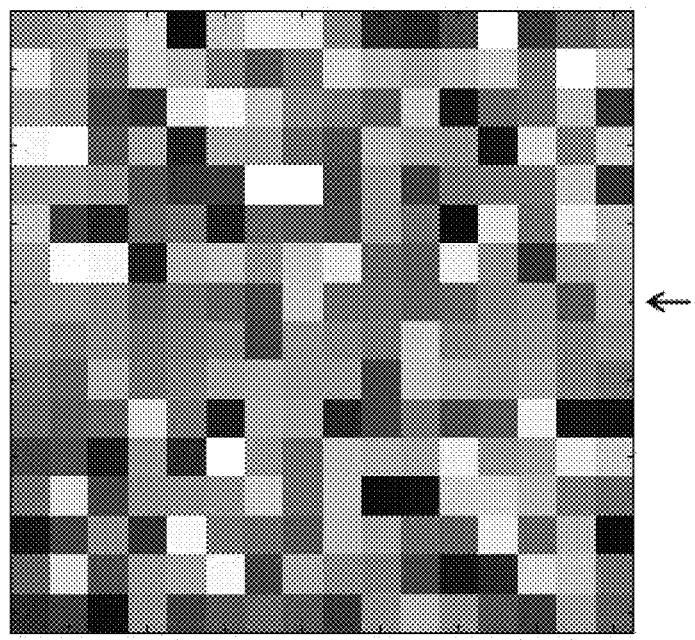
FIGS. 13A and 13B are images obtained by performing Fourier transform for measurement areas and performing computation according to equation (14), where
Figure 13B:

FIGS. 13A and 13B are images obtained by performing Fourier transform for the measurement areas and performing computation according to equation (14). FIG. 13A is a two-dimensional image, and FIG. 13B is an image representing a row of information indicated by an arrow in FIG. 13A of which the spatial frequency in the Y direction is zero. FIG. 14 is a diagram showing a cross section of the Fourier coefficients shown in FIG. 13B and a straight line approximating the Fourier coefficients.

Fourier coefficients of the measurement area are obtained by performing the Fourier transform for the subtracted image within the measurement area MA. Furthermore, by performing the processing according to equations (13) and (14) using the Fourier transform, and approximating the result obtained form processing the Fourier coefficients in the measurement area MA by a straight line, the value of $\Delta$ is calculated from the gradient of the straight line.

As described above, by using Fourier coefficients at low spatial frequencies, it is possible to acquire accurate three-dimensional position information with small noises. In step S35, Fourier coefficients in the predetermined spatial frequency band are extracted. The Fourier coefficients thus extracted are approximated by a straight line as shown in FIG. 14, and the gradient of the straight line is calculated. This gradient represents the transverse displacement between the two images with which subtraction was performed in the measurement area MA. As the transverse displacement is thus determined, it is possible to calculate the value of $\delta z$ by equation (7). Therefore, the aforementioned gradient serves as three-dimensional position information.

Figure 14:
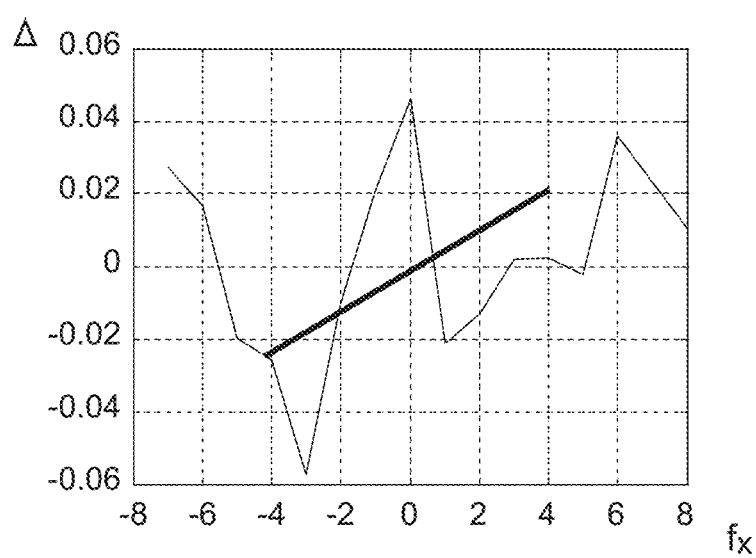
FIG. 14 is a diagram showing a cross section of the Fourier coefficients shown in FIG. 13B and a straight line approximating the Fourier coefficients.

The gradient of the straight line shown in FIG. 14 thus obtained can be regarded as the gradient in the neighborhood of the center pixel (frequency=0) among the 16 (sixteen) pixels shown in FIG. 13B. In the case shown in FIG. 14, the extraction of Fourier coefficients in the predetermined spatial frequency band and the approximation of the extracted Fourier coefficients by a straight line are performed using the Fourier coefficients of one row of pixels. Alternatively, averaging of multiple pixel rows near the location at which the frequency along the Y direction is equal to zero may be performed, and the Fourier coefficients of the pixels subject to averaging may be used. This alternative method can provide a result with reduced noises.

The measurement area MA is set at an arbitrary position in the image, and extraction of Fourier coefficients in a predetermined spatial frequency band, approximation of the extracted Fourier coefficient by a straight line, and calculation of the gradient of the approximated straight line are performed at that position. The gradient thus calculated is set as the gradient at the central pixel in the measurement area MA. Then, the measurement area MA is shifted to another position, and extraction of Fourier coefficients in a predetermined spatial frequency band, approximation of the extracted Fourier coefficient by a straight line, and calculation of the gradient of the approximated straight line are performed at the position after the shift. The gradient thus calculated is set as the gradient at the central pixel in the measurement area MA. The above-described shift of the measurement area MA and the processing at the position after the shift are performed repeatedly. Consequently, the gradients associated with pixels of the image are calculated.

In the three-dimensional position information acquiring method according to the embodiment, the transverse displacement with the sign (plus or minus) at each pixel from the gradient at each pixel can be determined. Therefore, it is possible to determine the $\delta z$ including whether $\delta z$ is displaced on the front side or on the rear side relative to the in-focus position. Further, the three-dimensional position information is acquired from $\delta z$ as such and the position of each pixel. Thus, according to the three-dimensional position information acquiring method according to the embodiment, it is possible to acquire accurate three-dimensional position information with reduced noise.

Moreover, a three-dimensional position information acquiring apparatus according to an embodiment includes a light source, an illumination optical system that guides light from the light source to an observed object, an imaging optical system that forms an image of the observed object, an image pickup element that picks up the image of the observed object, an aperture element, a processing device that processes the picked up image by computation processing, and a drive unit that drives the aperture element, the aperture element has an aperture that allows a portion of light coming from points on the observed object to pass through it, a first area is formed by positioning the aperture at a first position and a second area is formed by positioning the aperture at a second position, the computation processing includes acquiring an image of a first optical image, acquiring an image of a second optical image after acquiring the image of the first optical image, and performing a predetermined computation using image data of the first optical image and image data of the second optical image, acquisition of the image of the first optical image is performed based on light beams having passed through the first area, acquisition of the image of the second optical image is performed based on light beams having passed through the second area, the position of the center of the first area and the position of the center of the second area are both away from the optical axis of the optical system in a plane perpendicular to the optical axis of the optical system, the first area and the second area respectively include at least portions that do not overlap with each other, and three-dimensional position information about an observed object is acquired by the predetermined computation.

Figure 15A:
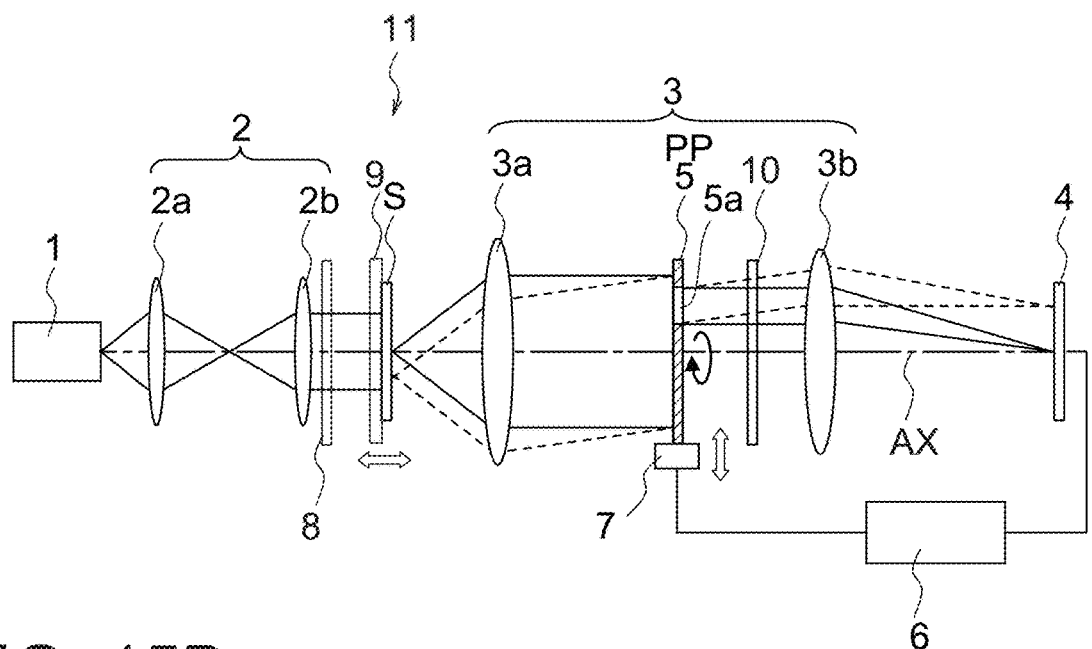
FIGS. 15A, 15B, and 15C are diagrams showing a three-dimensional position information acquiring apparatus according to a first embodiment.
Figure 15B:
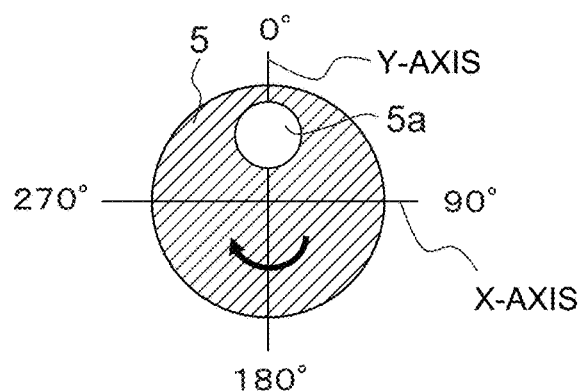
Figure 15C:
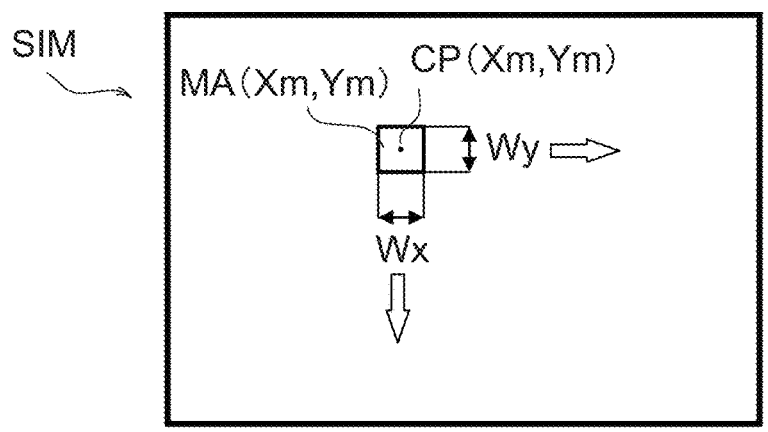

A three-dimensional position information acquiring apparatus according to a first embodiment will be described. FIGS. 15A, 15B, and 15C are diagrams for illustrating the three-dimensional position information acquiring apparatus according to the first embodiment. FIG. 15A is a diagram illustrating the three-dimensional position information acquiring apparatus. FIG. 15B is a diagram showing the position of an aperture. FIG. 15C is a diagram illustrating computation processing.

The three-dimensional position information acquiring apparatus 11 is a fluorescence microscope. In fluorescence observation, when an observed object is irradiated with excitation light, fluorescent light is emitted. Therefore, in the case of the apparatus shown in FIG. 15A, a transmission illumination optical system is used as the illumination optical system for irradiating excitation light. Alternatively, an epi-illumination optical system can be used instead of the transmission illumination optical system without any problem.

Moreover, in the case of dark field illumination, illumination light is irradiated at an angle larger than the numerical aperture of the imaging optical system. This type of illumination optical system may be employed as a transmission illumination optical system or an epi-illumination optical system. Further, by making an angle of incidence of the dark field illumination large, illumination optical system which illuminate the observed object from the direction nearly perpendicular may be employed.

As shown in FIG. 15A, the three-dimensional position information acquiring apparatus 11 has a light source 1, an illumination optical system 2, an imaging optical system 3, an image pickup element 4, an aperture element 5, a processing device 6, and a drive unit 7. The illumination optical system 2 is arranged on one side of the observed object S, and the imaging optical system 3 is arranged on the other side of the observed object S.

The illumination optical system 2 includes a lens 2a and a lens 2b. Since the three-dimensional position information acquiring apparatus 11 is a fluorescence microscope, excitation filter 8 is disposed between the illumination optical system 2 and the observe object S. The excitation filter 8 may be disposed at any desired location between the optical source 1 and the observed object S.

A stage 9 is located between the illumination optical system 2 and the imaging optical system 3. The observed object S is placed on the stage 9. The stage 9 can be moved in the direction along the optical axis AX and directions perpendicular to the optical axis AX.

The imaging optical system 3 includes a lens 3a and a lens 3b. The lens 3a is an objective lens, and the lens 3b is an tube lens. A barrier filter 10 is disposed between the lens 3a and the lens 3b. The barrier filter 10 may be disposed at any desired location between the observed object S and the image pickup element 4.

Moreover, the aperture element 5 is disposed between the observed object S and the image pickup element 4. In the case shown in FIG. 15A, the aperture element 5 is disposed between the lens 3a and the lens 3b. As shown in FIG. 15B, the shape of the aperture element 5 is, but not limited to, circular.

The aperture element 5 has an aperture 5a. The aperture 5a is provided at a position away from the center of the aperture element 5. The diameter of the aperture 5a is smaller than the radius of the aperture element 5. Therefore, the area of the aperture 5a does not include the center of the aperture element 5, as shown in FIG. 15B.

The diameter of the aperture 5a may be larger than the radius of the aperture element 5, so long as the aperture 5a is offset from the center of the aperture element 5. While the shape of the aperture 5a shown in FIG. 15B is circular, the aperture 5a may have other shapes.

The aperture element 5 may be made of an opaque plate, e.g. a metal plate. In the case where the aperture element 5 is a metal plate, the aperture 5a is an opening provided in the metal plate. The aperture element 5 may be made of a transparent plate, such as a glass plate or a plastic plate. In this case, the aperture 5a is made up of the plate, and the portions of the plate other than the aperture 5a is covered with an opaque material by coating or deposition.

Moreover, the aperture element 5 may be made of a liquid crystal element. It is possible to make the portion other than the aperture 5a opaque by changing the operation area of the liquid crystal. In the case where the aperture element 5 is a liquid crystal element, it is possible to dispose the aperture element 5 in the optical path of the imaging optical system 3 all the time.

The image pickup element 4 is arranged at the position of an image of the observed object S. When the position of the observed object S coincides with the in-focus position of the imaging optical system 3, an image of the observed object S is formed. The position at which the image pickup element 4 is arranged is the position of this image.

The image pickup element 4 picks up the image of the observed object S. In the image pickup element 4, the intensity of light of the image of the observed object S is converted into an electrical signal. Thus, an image of the image of the observed object S is acquired. The electrical signal output from the image pickup element 4 is input to the processing device 6, and image data of the image of the observed object S is held in the processing apparatus 6.

The drive unit 7 is connected with the processing device 6. The drive unit 7 moves, for example rotates or slides, the aperture element 5. The position of the aperture 5a changes with the movement of the aperture element 5.

In the case shown in FIG. 15A, the drive unit 7 rotates the aperture element 5 about the optical axis AX. The position of the aperture 5a changes accordingly. The aperture element 5 and the drive unit 7 can be inserted into and retracted out of the optical path of the imaging optical system 3. For this purpose, the three-dimensional position information acquiring apparatus 11 is provided with a shift unit that is not shown in the drawings. When the aperture element 5 is placed in the optical path of the imaging optical system 3, the process of acquiring three-dimensional position information can be performed. When the aperture element 5 is placed outside the optical path, it is possible to perform observation and image-pickup of the fluorescent image.

Illumination light emitted from the light source passes through the illumination optical system 2 and enters the excitation filter 8. At the excitation filter 8, only light with a specific wavelength range is transmitted through the excitation filter 8. The light transmitted through the excitation filter 8, which is called excitation light, is incident on the observed object S. In the observed object S irradiated with the excitation light, fluorescent light is generated.

In FIG. 15A, fluorescent light generated at a point on an axial point is indicated by solid lines, and fluorescent light generated at an off-axis point is indicated by broken lines. The excitation light and fluorescent light are incident on the lens 3a. The excitation light and fluorescent light transmitted through the lens 3a travel to the aperture element 5. At the aperture element 5, the excitation light and the fluorescent light pass through the aperture 5a. The aperture 5a allows a portion of the light coming from points on the observed object S to pass through it. It is preferred that the aperture 5a is arranged at such a position that allows both light from the axial object point and off-axis object points to pass through it.

The excitation light and the fluorescent light having passed through the aperture 5a enter the barrier filter 10. At the barrier filter 10, only the fluorescent light is transmitted through. Then, the fluorescent light is incident on the lens 3b and focused by the lens 3b onto the image pickup element 4. Thus, a fluorescent image of the observed object S is formed on the image pickup element 4.

How three-dimensional position information is acquired will be described. Firstly, acquisition of an image of a first optical image is performed. The drive unit 7 causes the aperture element 5 to rotate based on a command from the processing apparatus 6. The drive unit 7 stops the rotation of the aperture element 5 at a first position. FIG. 15A shows a state in which the aperture 5a is set at the first position. As shown in FIG. 15B, when seen along the optical axis AX, the aperture 5a is located at the position of 0°. The position of 0° refers to the position on the Y axis on the 0° side of the X axis (on the Y axis in the positive region).

A first area is formed by moving the aperture 5a to the first position. A first fluorescent image is formed on the image pickup element 4 by light beams from points on the observed object S and having passed through the first area. The first fluorescent image is picked up by the image pickup element 4, and thereby acquisition of an image of the first fluorescent image is performed.

The acquisition of the image of the first optical image is finished, acquisition of an image of a second optical image is performed. The drive unit 7 causes the aperture element 5 to rotate based on a command from the processing apparatus 6. The drive unit 7 stops the rotation of the aperture element 5 at a second position. The second position is rotationally 180° away from the first position. In FIG. 15B, when seen along the optical axis AX, the aperture 5a is located at the position of 180°. The position of 180° refers to the position on the Y axis on the 180° side of the X axis (on the Y axis in the negative region). The position of 180° and the position of 0° are line-symmetric with respect to the X axis.

When the aperture 5a is set to the second position, a second area is formed. A second fluorescent image is formed on the image pickup element 4 by light beams from points on the observed object S having passed through the second area. The second fluorescent image is picked up by the image pickup element 4, and thereby acquisition of an image of the second fluorescent image is performed. The first fluorescent image and the second fluorescent image are images of the same region of the observed object S.

The aperture 5a is provided at a position away from the center of the aperture element 5. Therefore, in the plane perpendicular to the optical axis of the imaging optical system 3, the position of the center of the first area and the position of the center of the second area are both away from the optical axis. The first area and the second area respectively include at least portions that do not overlap with each other.

In the three-dimensional position information acquiring apparatus according to this embodiment, it is preferable that the first optical image and the second optical image are formed on the same image pickup element.

By forming the first optical image and the second optical image on the same image pickup element, a positional displacement can be prevented from occurring when the first optical image and the second optical image are picked up. As a result, since overall alignment of the first image and the second image dose not need, it is possible to simplify the arrangement of the three-dimensional position information acquiring apparatus 11.

In the three-dimensional position information acquiring apparatus according to this embodiment, it is preferable that the aperture element is arranged at one of the pupil position of the illumination optical system, the pupil position of the imaging optical system, and the position conjugate with the pupil position of the imaging optical system.

With this arrangement, it is possible to form the first area and the second area at such positions that allow light from an axial object point and light from off-axis object points both pass through them.

The acquisition of the image of the second optical image is finished, predetermined computation is performed. Since the method of acquiring three-dimensional position information by using the first image and the second image has already been described, the computation process will be described in the following only briefly.

In the computation process, subtraction is performed using image data of the first fluorescent image and image data of the second fluorescent image. Subtraction is performed using the image intensity distribution $I_0$ of the first image and the image intensity distribution $I_{180}$ of the second image, and thereby a subtracted image $I_0-I_{180}$ is generated.

Moreover, addition is performed using the two images to generate a sum image $I_0+I_{180}$.

Then, each of the subtracted image $I_0-I_{180}$ and the sum image $I_0+I_{180}$ is divided into a plurality of measurement areas. In FIG. 15C, the area MA(Xm, Ym) is one measurement area. The area MA(Xm, Ym) is an area whose center coordinates is CP(Xm, Ym), width along the X axis is Wx, and width along the Y axis is Wy. Thus, the area MA is an area of Xm±Wx/2 along the X axis and Ym±Wy/2 along the Y axis.

The amount of shift of the point spread function is calculated for the area MA(Xm, Ym). This calculation is performed based on equation (14). Here, in the first area and the second area, since the aperture 5a is located on the Y axis, the direction of shift of the point spread function is a direction along the Y axis. When the amount of shift of the point spread function at CP(Xm, Ym) is represented by $\Delta$(Xm, Ym), the amount of shift of the point spread function along the Y axis can be represented by $\Delta_y$(Xm, Ym). $\Delta_y$(Xm, Ym) can be calculated by equation (14).

A conjugate point of CP (Xm, Ym) is located on the observed object S. The position of the conjugate point of CP(Xm, Ym) is represented by cp(xm, ym). As $\Delta_y$(Xm, Ym) is determined, δz can be calculated from equation (7). Here, $\Delta_y$(Xm, Ym) is an amount at CP(Xm, Ym). Since δz calculated by equation (7) is an amount at cp(xm, ym), it may be expressed as δz(xm, ym).

δz (xm, ym) is the amount of displacement of the point cp(xm, ym) on the observe object S along the Z direction on the object side. In other words, δz(xm, ym) represents the distance from the surface of the observed object S at point cp(xm, ym) to the in-focus position.

The measurement area MA is shifted along the Y direction by a predetermined shift amount, $\Delta_y$ is calculated at each position, and δz is calculated from the calculated value of $\Delta_y$. Thus, distance between the observed object S and the in-focus position at each position along the Y direction can be determined. Furthermore, the measurement area MA is shifted along the X direction by a predetermined shift amount, $\Delta_y$ is calculated at each position, and δz is calculated from the calculated value of $\Delta_y$. As above, by shifting the measurement area MA in the X and Y directions in a scanning manner, it is possible to acquire three-dimensional position information of the observed object S.

As described above, according to the embodiment of the three-dimensional position information acquiring apparatus, since the amount of displacement of the observed object from the in-focus position of the optical system can be measured even in the case where the amount of displacement corresponds to an amount which is smaller than the depth of focus of the optical system, it is possible to acquire three-dimensional position information with high resolution.

Moreover, in the three-dimensional position information acquiring apparatus according to this embodiment, an arrangement may be made such that a third area is formed by shifting the aperture to a third position and a fourth area is formed by shifting the aperture to a fourth position.

For example, in the case where a structure of the observed object S is a fibrous structure, it may be substantially uniform without any edge or the like over an area longer than the width Wy of the measurement area MA along the Y direction. In the case of such an observed object, even when the observed object is located at a position displaced from the in-focus position along the Z direction, the image contrast of the subtracted image in the measurement area MA is low. Therefore, it may be impossible to determine the gradient $\Delta_y$ accurately in some cases. Such an observed object has an edge or the like in the X direction of the measurement area MA. Therefore, it is possible to determine the value of δz by calculating the value of $\Delta_x$ from a subtracted image with respect to the X direction.

To this end, the aperture 5*a* is shifted to the position of 90° (third position) and the position of 270° (fourth position) in addition of the position of 0° (first position) and the position of 90° (second position) to obtain a third image and a fourth image.

Subtraction is performed using the image intensity distribution $I_0$ of the first image and the image intensity distribution $I_{180}$ of the second image, and thereby a subtracted image $I_0-I_{180}$ is generated. Moreover, addition is performed using the image intensity distributions of the two images, and thereby a sum image $I_0+I_{180}$ is generated. Then, $\Delta_y$ is calculated from the subtracted image $I_0-I_{180}$ and the sum image $I_0+I_{180}$.

Next, subtraction is performed using the image intensity distribution $I_{90}$ of the third image and the image intensity distribution $I_{270}$ of the fourth image, and thereby a subtracted image $I_{90}-I_{270}$ is generated. Moreover, addition is performed using the image intensity distributions of the two images, and thereby a sum image $I_{90}+I_{270}$ is generated. Then, $\Delta_x$ is calculated from the subtracted image $I_{90}-I_{270}$ and the sum image $I_{90}+I_{270}$.

The value of $\Delta_y$ and the value of $\Delta_x$ are compared with a predetermined value. In the case where a boundary or an edge is formed on the surface of the observed object S in the range of the measurement area MA, since the image contrast of the subtracted image with respect to the X direction and the image contrast of the subtracted image with respect to the Y direction are substantially the same, the calculated value of $\Delta_x$ and the value of $\Delta_y$ are nearly equal to each other. Therefore, the average of $\Delta_x$ and $\Delta_y$ or the value of one of $\Delta_x$ and $\Delta_y$ is set as the value of $\Delta_x$ Then, δz is calculated from Δ.

However, in the case where a structure of the observed object S is a fibrous structure and fiber extends along the Y direction, the image contrast of the subtracted image with respect to the Y direction is low. In this state, if the value of $\Delta_y$ is smaller than the predetermine value, it is not possible to determine whether the position of the observed object coincides with the in-focus position. In such cases, if the value of $\Delta_x$ can be determined from the image contrast of the subtracted image with respect to the X direction, the value of $\Delta_x$ is set as the value of $\Delta_x$ Similarly, in the case where the fiber extends along the X direction, it is not possible to determine whether the position of the observed object coincides with the in-focus position from the value of $\Delta_x$ Then, the value of $\Delta_x$ is set as the value of Δ, and δz is calculated from Δ.

As described above, in the case where a structure of the observed object S is a fibrous structure and fiber extends along the Y direction for instance, since the image contrast of the subtracted image with respect to the Y direction may be low, the value of $\Delta_y$ is smaller than the predetermined value, in some cases. In this case, it is determined that since the position of the observed object coincides with the in-focus position, δz cannot be calculated. However, in the case where the image intensity distribution $I_0$ of the first image, the image intensity distribution $I_{90}$ of the third image, the image intensity distribution $I_{180}$ of the second image, and the image intensity distribution $I_{270}$ of the fourth image are acquired, since the value of $\Delta_x$ become to be larger than the predetermined value, it is possible to calculate δz.

Figure 16:
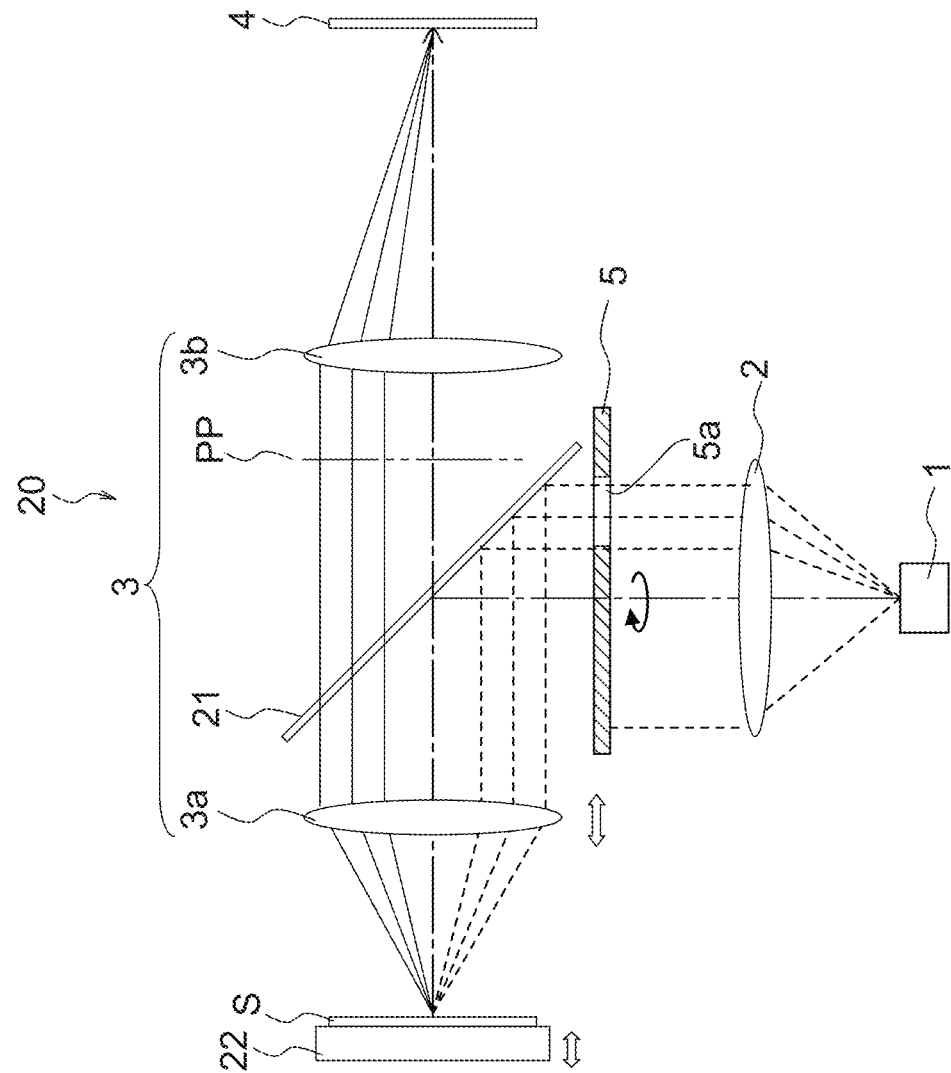
FIG. 16 is a diagram showing a three-dimensional position information acquiring apparatus according to a second embodiment.

Next, a three-dimensional position information acquiring apparatus according to a second embodiment will be described. FIG. 16 is a diagram showing the three-dimensional position information acquiring apparatus according to the second embodiment. The components same as those in FIG. 15A are denoted by the same reference numerals and will not be described further.

The three-dimensional position information acquiring apparatus 20 is an epi-illumination microscope used to observe the surface of a metal or the like. In the case of the three-dimensional position information acquiring apparatus according to the second embodiment, the aperture element 5 is arranged at a position different from the pupil position PP of the imaging optical system 3. We will show that the apparatus having such an arrangement can also obtain the advantageous effects same as the three-dimensional position information acquiring apparatus according to the first embodiment. In FIG. 16, illumination light is indicated by broken lines, and light from the observed object S is indicated by solid lines.

The three-dimensional position information acquiring apparatus 20 includes a light source 1, an illumination optical system 2, an imaging optical system 3, an image pickup element 4, and an aperture element 5. A processing apparatus and a drive unit are not shown in the drawings. The illumination optical system 2 and the imaging optical system 3 are arranged on aside of the image pickup element 4 of the observed object S.

The illumination light emitted from the light source 1 passes through the illumination optical system. 2 and enters the aperture element 5. At the aperture element 5, the illumination light passes through the aperture 5*a*. The aperture 5*a* allows only a portion of the illumination light to pass through it. The illumination light having passed through the aperture 5*a* is reflected by a half mirror 21 and incident on the lens 3*a*. The illumination light incident on the lens 3*a* illuminates the observed object S. The observed object S is placed on a stage 22.

In FIG. 16, a state in which the illumination light is focused on a point is shown. However, since the light source 1 is a surface light source, an appropriate area on the surface of the observed object S is illuminated by the illumination light.

Light from the observed object S enters the lens 3*a*, then is transmitted through the half mirror 21, and then enters the lens 3*b*. The light from the observed object S incident on the lens 3*b* is focused by the lens 3*b* onto the image pickup element 4. Thus, an image of the observed object S is formed on the image pickup element 4.

In the three-dimensional position information acquiring apparatus 20, the aperture element 5 is not arranged at the pupil position PP of the imaging optical system 3. The aperture element 5 is arranged in the illumination optical system 2. The position at which the aperture element 5 is arranged is the pupil position of the illumination optical system 2, which is conjugate with the pupil position PP of the imaging optical system 3. In the case of the three-dimensional position information acquiring apparatus 20 also, a first area and a second area are formed by changing the position of the aperture 5*a*.

As shown in FIG. 16, in the case of the three-dimensional position information acquiring apparatus 20 also, the aperture 5*a* is provided at a position away from the center of the aperture element 5. Therefore, in the plane perpendicular to the optical axis of the illumination optical system 2, the position of the center of the first area and the position of the center of the second area are both away from the optical axis. The first area and the second area respectively include at least portions that do not overlap with each other.

Moreover, at the pupil position PP of the imaging optical system 3 also, in the plane perpendicular to the optical axis of the imaging optical system 3, the position of the center of the first area and the position of the center of the second area are both away from the optical axis. Moreover, the first area and the second area respectively include at least portions that do not overlap with each other.

How three-dimensional position information is acquired will be described. Firstly, acquisition of an image of a first optical image is performed. In the acquisition of the image of the first optical image, the aperture element 5 is rotated and stopped at the first position. The first area is formed by moving the aperture 5a to the first position. The observed object S is illuminated with light beams having passed through the first area. The first optical image of the observed object S is formed on the image pickup element 4. The first optical image is picked up by the image pickup element 4, and thereby acquisition of the image of the first optical image is performed.

The acquisition of the image of the first optical image is finished, acquisition of an image of a second optical image is performed. In the acquisition of the image of the second optical image, the aperture element 5 is rotated and stopped at the second position. The second area is formed by moving the aperture 5a to the second position. The observed object S is illuminated with light beams having passed through the second area. The second optical image of the observed object S is formed on the image pickup element 4. The second optical image is picked up by the image pickup element 4, and thereby acquisition of the image of the second optical image is performed.

The acquisition of the image of the second optical image is finished, predetermined computation is performed. The method of acquiring three-dimensional position information using the image intensity distribution $I_0$ of the first image and the image intensity distribution $I_{180}$ of the second image has already been described and will not be described in connection with this embodiment.

Figure 17:
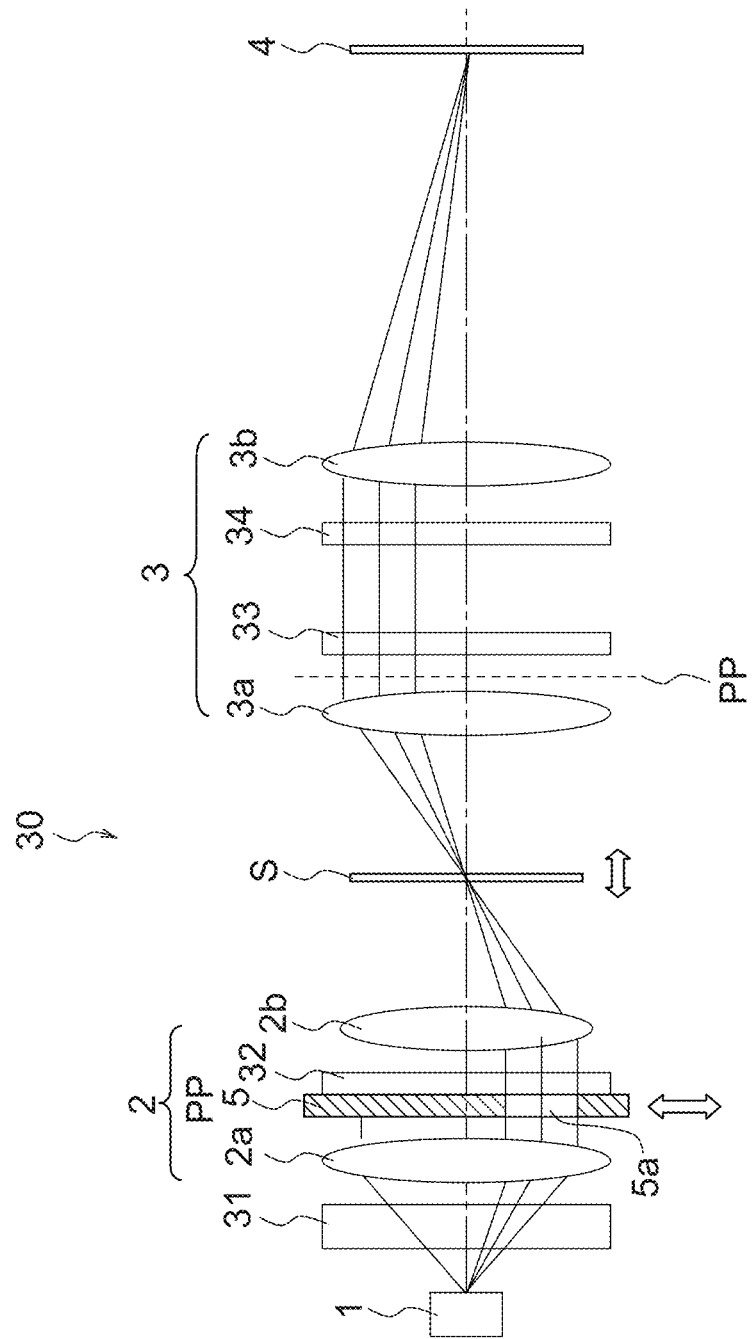
FIG. 17 is a diagram showing a three-dimensional position information acquiring apparatus according to a third embodiment.

Next, a three-dimensional position information acquiring apparatus according to a third embodiment will be described. FIG. 17 is a diagram showing the three-dimensional position information acquiring apparatus according to the third embodiment. The components same as those in FIG. 15A are denoted by the same reference numerals and will not be described further.

The three-dimensional position information acquiring apparatus 30 is a differential interference contrast microscope. In the case of the three-dimensional position information acquiring apparatus 30 according to the third embodiment, the aperture element 5 is arranged at a position different from the pupil position PP of the imaging optical system 3. We will show that the apparatus having such an arrangement can also obtain the advantageous effects same as the three-dimensional position information acquiring apparatus according to the first embodiment.

The three-dimensional position information acquiring apparatus 30 includes a light source 1, an illumination optical system 2, an imaging optical system 3, an image pickup element 4, and an aperture element 5. A stage, a processing apparatus, and a drive unit are not shown in the drawings. The illumination optical system 2 is arranged on one side of the observed object S, and the imaging optical system 3 is arranged on the other side of the observed object S.

Illumination light emitted from the light source 1 passes through a phase modulator 31 and enters the illumination optical system 2. The illumination light is transmitted through the lens 2a and enters the aperture element 5. At the aperture element 5, the illumination light passes through the aperture 5a. The aperture 5a allows only a portion of the illumination light to pass through it. The illumination light having passed through the aperture 5a passes through a Nomarski prism 32 and is incident on the lens 2b. The illumination light incident on the lens 2b illuminates the observed object S.

In FIG. 17, a state in which the illumination light is focused on a point is shown. However, since the light source 1 is a surface light source, an appropriate area on the surface of the observed object S is illuminated by the illumination light.

Light from the observed object S enters the lens 3a, then is transmitted through a Nomarski prism 33 and a polarizer element 34, and then enters the lens 3b. The light from the observed object S incident on the lens 3b is focused by the lens 3b onto the image pickup element 4. Thus, an image of the observed object S is formed on the image pickup element 4.

In the three-dimensional position information acquiring apparatus 30, the aperture element 5 is not arranged at the pupil position PP of the imaging optical system 3. The aperture element 5 is arranged in the illumination optical system 2. The position at which the aperture element 5 is arranged is the pupil position PP of the illumination optical system 2, which is conjugate with the pupil position PP of the imaging optical system 3. In the case of the three-dimensional position information acquiring apparatus 30 also, a first area and a second area are formed by changing the position of the aperture 5a.

As shown in FIG. 17, in the case of the three-dimensional position information acquiring apparatus 30 also, the aperture 5a is provided at a position away from the center of the aperture element 5. Therefore, in the plane perpendicular to the optical axis of the illumination optical system 2, the position of the center of the first area and the position of the center of the second area are both away from the optical axis. The first area and the second area respectively include at least portions that do not overlap with each other.

Moreover, at the pupil position PP of the imaging optical system 3 also, in the plane perpendicular to the optical axis of the imaging optical system 3, the position of the center of the first area and the position of the center of the second area are both away from the optical axis. Moreover, the first area and the second area respectively include at least portions that do not overlap with each other.

How three-dimensional position information is acquired will be described. Firstly, acquisition of an image of a first optical image is performed. In the acquisition of the image of the first optical image, the aperture element 5 is rotated and stopped at the first position. The first area is formed by moving the aperture 5a to the first position. The observed object S is illuminated with light beams having passed through the first area. The first optical image of the observed object S is formed on the image pickup element 4. The first optical image is picked up by the image pickup element 4, and thereby acquisition of the image of the first optical image is performed.

The acquisition of the image of the first optical image is finished, acquisition of an image of a second optical image is performed. In the acquisition of the image of the second optical image, the aperture element 5 is rotated and stopped at the second position. The second area is formed by moving the aperture 5a to the second position. The observed object S is illuminated with light beams having passed through the second area. The second optical image of the observed object S is formed on the image pickup element 4. The second optical image is picked up by the image pickup element 4, and thereby acquisition of the image of the second optical image is performed.

In the three-dimensional position information acquiring apparatus 11 and the three-dimensional position information acquiring apparatus 20, the images acquired are images representing only the light intensity of fluorescent light or diffused light. On the other hand, since the three-dimensional position information acquiring apparatus 30 is an apparatus employing a differential interference contrast microscope, a phase distribution attributed to the observed object is visualized as an image intensity distribution. Therefore, in the three-dimensional position information acquiring apparatus 30, the image of the observed object is acquired as an image in which the phases have been replaced by light intensities. This image contains not only the phase distribution but also components of background light that has been transmitted through the observed object. Therefore, in order to acquire three-dimensional position information from the phase distribution of the observed object, it is necessary to change the acquired image into an image from which the background components are removed, before acquiring the second optical image.

Therefore, in the acquisition of the first optical image, an image $I(+\theta, 0°)$ for which the retardation of the phase modulator is set to $+\theta$ and an image $I(-\theta, 0°)$ for which the retardation of the phase modulator is set to $-\theta$ are acquired.

Likewise, in the acquisition of a second optical image, an image $I(+\theta, 180°)$ for which the retardation of the phase modulator is set to $+\theta$ and an image $I(-\theta, 180°)$ for which the retardation of the phase modulator is set to $-\theta$ are acquired.

Furthermore, the aperture 5a is shifted to the position of 90° (third position) and the position of 270° (fourth position), and a third image and a fourth image are acquired. In this case also, an image for which the retardation of the phase modulator is set to $+\theta$ and an image for which the retardation of the phase modulator is set to $-\theta$ are acquired. Thus, images $I(+\theta, 90°)$, $I(-\theta, 90°)$, $I(+\theta, 270°)$, and $I(-\theta, 270°)$ are acquired.

Then, the image intensity distribution $I_0$ of the first image, the image intensity distribution $I_{180}$ of the second image, the image intensity distribution $I_{90}$ of the third image, and the image intensity distribution $I_{270}$ of the fourth image are generated by performing computation according to the following equations (15) to (18).

$$I_0 = \{I(+\theta,0°) - I(-\theta,0°)\} / \{I(+\theta,0°) + I(-\theta,0°)\} \quad (15)$$

$$I_{90} = \{I(+\theta,90°) - I(-\theta,90°)\} / \{I(+\theta,90°) + I(-\theta,90°)\} \quad (16)$$

$$I_{180} = \{I(+\theta,180°) - I(-\theta,180°)\} / \{I(+\theta,180°) + I(-\theta,180°)\} \quad (17)$$

$$I_{270} = \{I(+\theta,270°) - I(-\theta,270°)\} / \{I(+\theta,270°) + I(-\theta,270°)\} \quad (18)$$

The method of acquiring three-dimensional position information using the image intensity distribution $I_0$ of the first image, the image intensity distribution $I_{180}$ of the second image, the image intensity distribution $I_{90}$ of the third image, the image intensity distribution $I_{270}$ of the fourth image has already been described and will not be described in connection with this embodiment.

Figure 18:
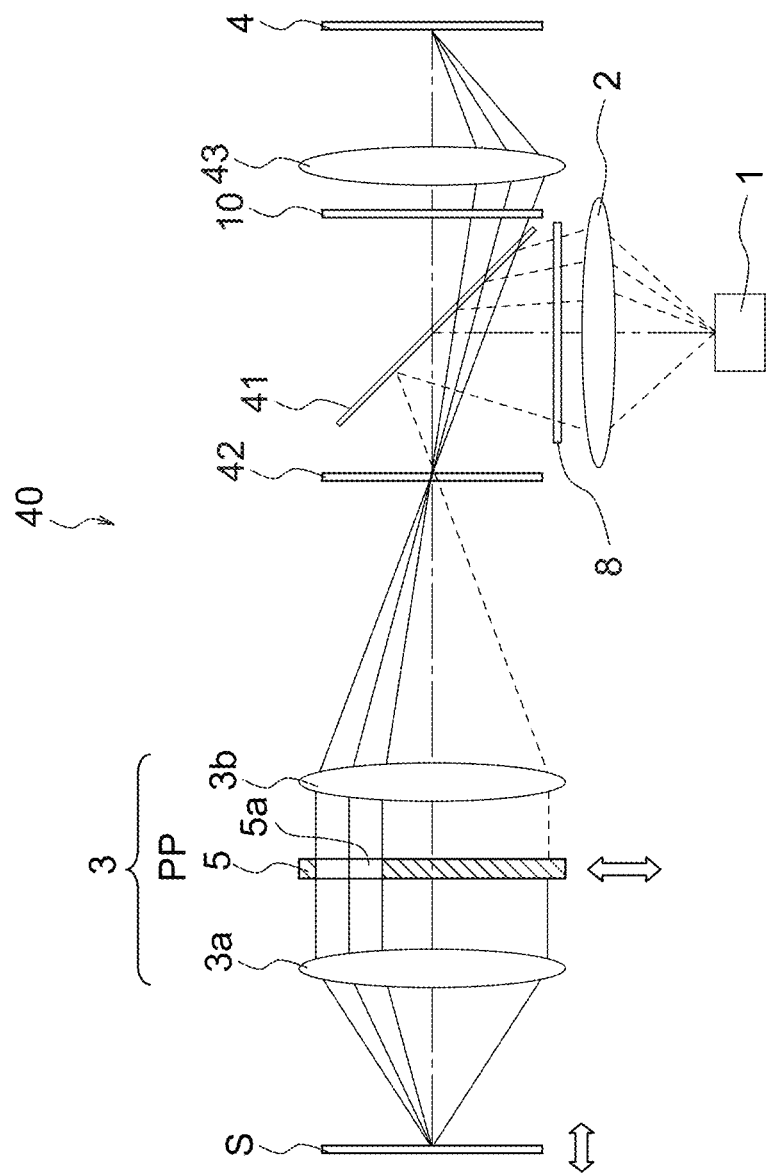
FIG. 18 is a diagram showing a three-dimensional position information acquiring apparatus according to a fourth embodiment.

Next, a three-dimensional position information acquiring apparatus according to a fourth embodiment will be described. FIG. 18 is a diagram showing the three-dimensional position information acquiring apparatus according to the fourth embodiment. The components same as those in FIG. 15A are denoted by the same reference numerals and will not be described further.

The three-dimensional position information acquiring apparatus 40 is a confocal fluorescence microscope. In FIG. 18, illumination light is indicated by broken lines, and light from the observed object S is indicated by solid lines. When the illumination light and the light from the observed object S travel along the same path, they are indicated by solid lines.

The three-dimensional position information acquiring apparatus 40 includes a light source 1, an illumination optical system 2, an imaging optical system 3, an image pickup element 4, and an aperture element 5. A processing apparatus and a drive unit are not shown in the drawings. The illumination optical system 2 and the imaging optical system 3 are arranged on a side of the image pickup element 4 of the observed object S.

Illumination light emitted from the light source 1 passes through the illumination optical system 2 and enters an excitation filter 8. At the excitation filter 8, only light with a specific wavelength range is transmitted through the excitation filter 8. The light transmitted through the excitation filter 8, which is called excitation light, is reflected by a dichroic mirror 41 and incident on a pinhole disk 42. The excitation light is focused onto the pinhole disk 42 by the illumination optical system 2. The excitation light passes through pinholes of the pinhole disk 42 and enters the imaging optical system 3.

The excitation light transmitted through a lens 3b enters the aperture element 5. At the aperture element 5, the excitation light passes through the aperture 5a of the aperture element 5. The aperture 5a allows a portion of the excitation light to pass through it. The excitation light having passed through the aperture 5a is transmitted through a lens 3a and incident on the observed object S. In the observed object irradiated with the excitation light, fluorescent light is generated.

In FIG. 18, a state in which the illumination light is focused on a point is shown. However, since the light source 1 is a surface light source, the entirety of the pinhole disk 42 is illuminated with the excitation light. Therefore, the excitation light emerges from the pinholes of the pinhole disk 42. Consequently, an appropriate range on the surface of the observed object S is irradiated with the excitation light as an aggregate of point images conjugate with the pinholes of the pinhole disk 42.

The excitation light and fluorescent light are incident on the lens 3a. The excitation light and fluorescent light transmitted through the lens 3a travel to the aperture element 5. At the aperture element 5, the excitation light and the fluorescent light pass through the aperture 5a. The aperture 5a allows a portion of light coming from points on the observed object S to pass through it.

The excitation light and the fluorescent light having passed through the aperture 5a are transmitted through the lens 3b and focused on the pinhole disk 42. The excitation light and the fluorescent light pass through pinholes of the pinhole disk 42, are transmitted through the dichroic mirror 41, and are incident on a barrier filter 10. In the barrier filter 10, only the fluorescent light is transmitted. The fluorescent light is incident on a lens 43 and focused onto the image pickup element 4 by the lens 43. Thus, a fluorescent image of the observed object S is formed on the image pickup element.

In the three-dimensional image information acquiring apparatus 40, the aperture element 5 is arranged at the pupil position PP of the imaging optical system 3. In the three-dimensional image information acquiring apparatus 40 also, a first area and a second area are formed by changing the position of the aperture 5*a*.

As shown in FIG. 18, in the case of the three-dimensional position information acquiring apparatus 40 also, the aperture 5*a* is provided at a position away from the center of the aperture element 5. Therefore, in the plane perpendicular to the optical axis of the imaging optical system 3, the position of the center of the first area and the position of the center of the second area are both away from the optical axis. The first area and the second area respectively include at least portions that do not overlap with each other.

How three-dimensional position information is acquired will be described. Firstly, acquisition of an image of a first optical image is performed. In the acquisition of the image of the first optical image, the aperture element 5 is rotated and stopped at the first position. The first area is formed by moving the aperture 5*a* to the first position. The observed object S is illuminated with light beams having passed through the first area. The first optical image of the observed object S is formed on the image pickup element 4. The first optical image is picked up by the image pickup element 4, and thereby acquisition of the image of the first optical image is performed.

The acquisition of the image of the first optical image is finished, acquisition of an image of a second optical image is performed. In the acquisition of the image of the second optical image, the aperture element 5 is rotated and stopped at the second position. The second area is formed by moving the aperture 5*a* to the second position. The observed object S is illuminated with light beams having passed through the second area. The second optical image of the observed object S is formed on the image pickup element 4. The second optical image is picked up by the image pickup element 4, and thereby acquisition of the image of the second optical image is performed.

The acquisition of the image of the second optical image is finished, predetermined computation is performed. The method of acquiring three-dimensional position information using the image intensity distribution $I_0$ of the first image and the image intensity distribution $I_{180}$ of the second image has already been described and will not be described in connection with this embodiment.

In the three-dimensional position information acquiring apparatus 40, a point image is formed on the pinhole disk 42 by the imaging optical system 3. The diameter of the pinholes of the pinhole disk 42 is designed to be nearly equal to the diameter of the point image. This is in order to achieve satisfactory confocal effect in cases where the magnification of the imaging optical system 3 is high and to keep sufficient brightness of the fluorescent image formed on the image pickup element 4.

Figure 1A:
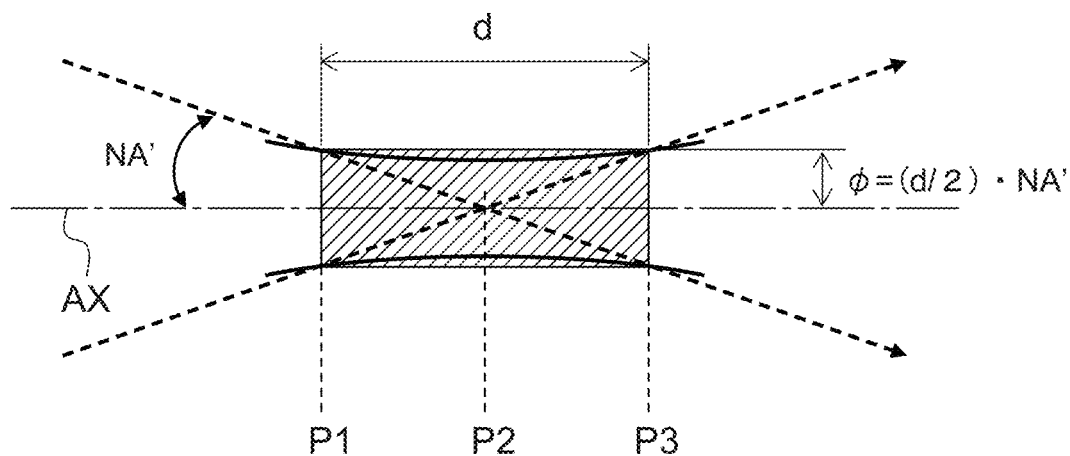
FIGS. 1A, 1B, and 1C are diagrams showing states of light beams in a typical optical system, where
Figure 1B:
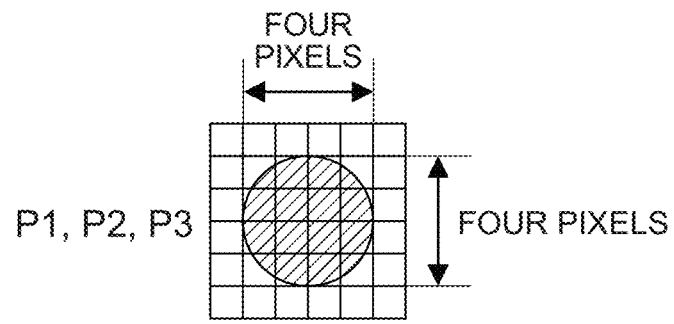
Figure 1C:
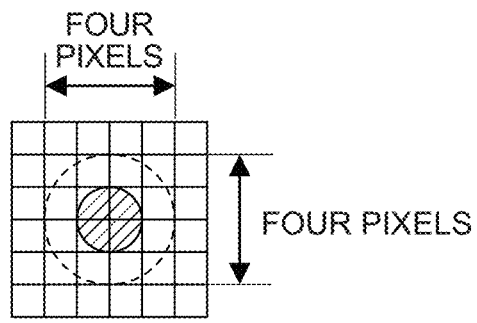

The 4×4 pixel area shown in FIG. 1B is regarded to be within the pinhole. In cases where the magnification of the imaging optical system 3 is high, the intensity distribution of the point image formed on the pinhole disk 42 spreads over the hatched area shown in FIG. 1B. In cases where the magnification of the imaging optical system 3 is low, the numerical aperture NA' tends to be larger than in cases where the magnification of the imaging optical system 3 is high. In the case where the numerical aperture NA' is large, the intensity distribution of the point image formed on the pinhole disk 42 spreads over the hatched area shown in FIG. 1C.

In the case where the numerical aperture NA' of the imaging optical system 3 is large, the spread of the point spread function is smaller than the diameter of the pinhole. In this case, the brightness of the image does not change unless the spread of the point spread function becomes large. Therefore, in the case of conventional confocal microscopes, in the case where the optical system having a large numerical aperture NA', in the case where the magnification of the imaging optical system 3 is low for example, the confocal effect is lower than in the case where the magnification of the imaging optical system 3 is high. In consequence, in the case where the magnification of the imaging optical system 3 is low, the resolution along the direction of optical axis is deteriorated.

In contrast, in the case of the three-dimensional position information acquiring apparatus 40, the aperture element 5 is provided at the pupil position of the imaging optical system 3. Therefore, in the plane perpendicular to the optical axis of the imaging optical system 3, the position of the center of the first area and the position of the center of the second area are both away from the optical axis. The first area and the second area respectively include at least portions that do not overlap with each other.

In consequence, if the observed object S is displaced from the in-focus position of the imaging optical system 3, the point spread function in the pinhole shifts in the plane of the pinhole disk 42, and the point image projected on the image pickup element 4 also shifts on the image pickup element 4 accordingly.

Furthermore, even in the case where the object side displacement amount corresponds to an amount which is smaller than the depth of focus, the point spread function shifts in the pinhole. Accordingly, the point image projected on the image pickup element 4 also shifts on the image pickup element 4. It is possible to determine the amount of shift, even in the case where the object side displacement amount corresponds to an amount which is smaller than the depth of focus.

As above, in the three-dimensional position information acquiring apparatus 40, it is possible to determine the amount of displacement from the in-focus position for each point on the observed object S by determining the value of Δ. Thus, in the three-dimensional position information acquiring apparatus 40, even in the case where the magnification of the imaging optical system 3 is low, since the confocal effect is not deteriorated substantially, it is possible to acquire three-dimensional position information.

Moreover, in three-dimensional position information acquiring apparatus 40, in the case where the object side displacement amount corresponds to an amount which is larger than the depth of focus, fluorescent light coming from a portion of which the object side displacement amount is large is blocked for the most part by the pinhole of the pinhole disk 42. Consequently, a blurred image of the observed object S is not formed on the image pickup element 4.

As above, in the three-dimensional position information acquiring apparatus 40, it is possible to improve accuracy in acquiring three-dimensional position information and signal to noise ratio in the three dimensional fluorescent image of the observed object S.

Figure 19A:
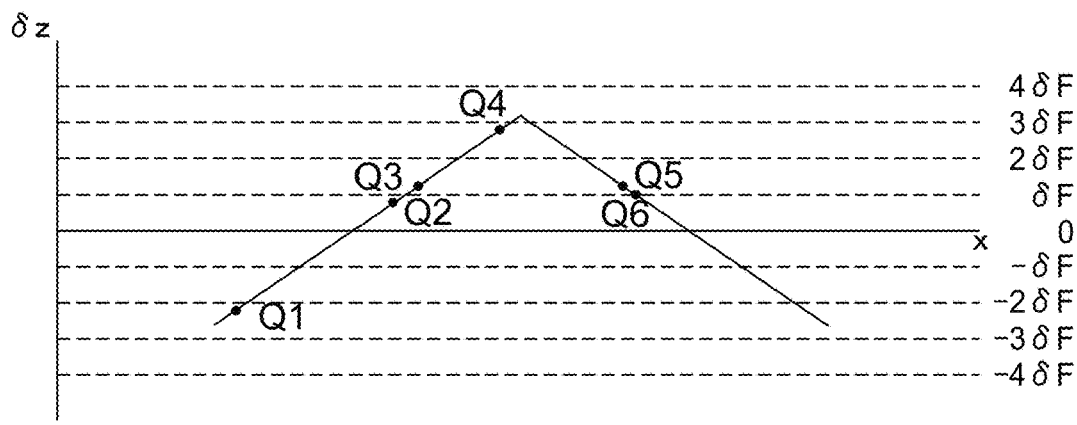
FIGS. 19A, 19B, and 19C are diagrams illustrating a first application of the three-dimensional position information acquiring method, where
Figure 19B:
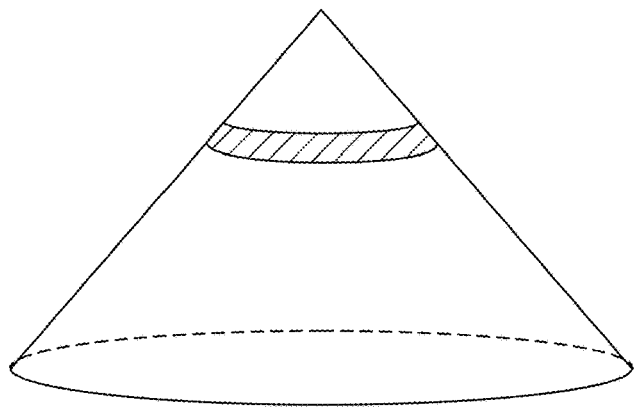
Figure 19C:
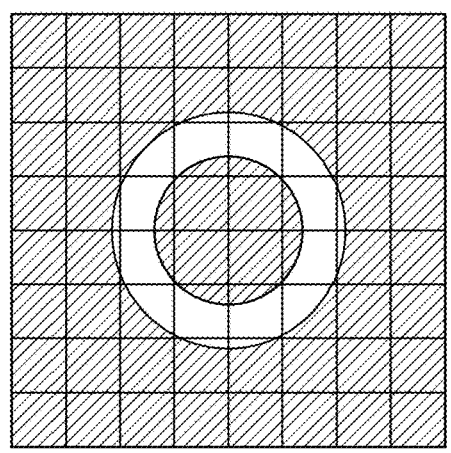

A first application of the three-dimensional position information acquiring method will be described. FIGS. 19A, 19B, and 19C are diagrams illustrating the first application of the three-dimensional position information acquiring method. FIG. 19A is a diagram illustrating sectioning of the object side displacement amount in units of δF. FIG. 19B is a diagram showing the shape of an observed object. FIG. 19C is a diagram showing binarized three-dimensional image information.

It is assumed that the value of Δ has been calculated by equation (14) for each pixel from the first image and the second image and that the value of δz of the observed object has been calculated by equation (7).

As shown in FIG. 19A, the value obtained by equally dividing the depth of focus of the imaging optical system on the observed object side by N is represented by δz, where displacements of the observed object away from the in-focus position of the imaging optical system are represented by minus values, and displacements of the observed object toward the in-focus position of the imaging optical system are represented by plus values.

Sectioning of δz(xm, ym) with δF is expressed by the following equation (19):

$$\delta z(xm, ym) = n\delta F \quad (19),$$

where $n\delta F - \delta F/2 \leq \delta z(xm, ym) < n\delta F + \delta F/2$, and
$n = 0, \pm 1, \pm 2, \ldots, \pm N$.

One section is selected from the sectioned δz. Since the value of Δ corresponding to a sectioned δz can be calculated inversely from equation (7), the value of Δ' corresponding to the selected section is calculated. The value of the pixels having value Δ' is set to 1, and the value of the other pixels is set to 0. The pixels with value 1 indicate that the observed object is present, and the pixels with value 0 indicate that the observed object is not present.

With this arrangement, binarized three-dimensional position information S(Xm, Ym, Δ', (Xm, Ym)) is generated. It is possible to acquire three-dimensional position information of the observed object sectioned by δF from S(Xm, Ym, Δ', (Xm, Ym)).

For example, the object side displacement amounts at points Q1 to Q6 in FIG. 19A are expressed as follows.

$$Q1(x_{Q1}, Y_{Q1}):\delta z_{Q1}(x_{Q1}, Y_{Q1}) = -2\delta F$$

$$Q2(x_{Q2}, Y_{Q2}):\delta z_{Q2}(x_{Q2}, Y_{Q2}) = 1\delta F$$

$$Q3(x_{Q3}, Y_{Q3}):\delta z_{Q3}(x_{Q3}, Y_{Q3}) = 1\delta F$$

$$Q4(x_{Q4}, Y_{Q4}):\delta z_{Q4}(x_{Q4}, Y_{Q4}) = 3\delta F$$

$$Q5(x_{Q5}, Y_{Q5}):\delta z_{Q5}(x_{Q5}, Y_{Q5}) = 1\delta F$$

$$Q6(x_{Q6}, Y_{Q6}):\delta z_{Q6}(x_{Q6}, Y_{Q6}) = 1\delta F$$

When 1δF is selected, since points Q2, Q3, Q5, and Q6 have sectioned value 1δF, these points are extracted. Δ' corresponding to 1δF is $\Delta_{1\delta F}'$. As described above, the image from which the value of Δ is calculated has been generated from the first image and the second image. Therefore, binarized three-dimensional image information S is generated from this image by setting the value of the pixels having value $\Delta_{1\delta F}'$ to 1 and setting the value of the other pixels to 0.

In FIG. 19B, the portion of the observed object having sectioned value 1δF is indicated by hatching. Consequently, the binarized three-dimensional image information S is as shown in FIG. 19C.

The first image and the second image contain light intensity information about the observed object. Therefore, it is possible to acquire an image of the observed object sectioned by δF from these images and the binarized three-dimensional image information S.

Moreover, the relative position of the observed object and the in-focus position of the imaging optical system may be varied along the direction of the optical axis. By performing what is called z-scan, the in-focus position of the imaging optical system can be shifted relating to the observed object along the Z direction. By doing this, it is possible to acquire wide ranging three-dimensional position information using three-dimensional position information at each in-focus position and the value of the interval of the z-scan.

Figure 20A:
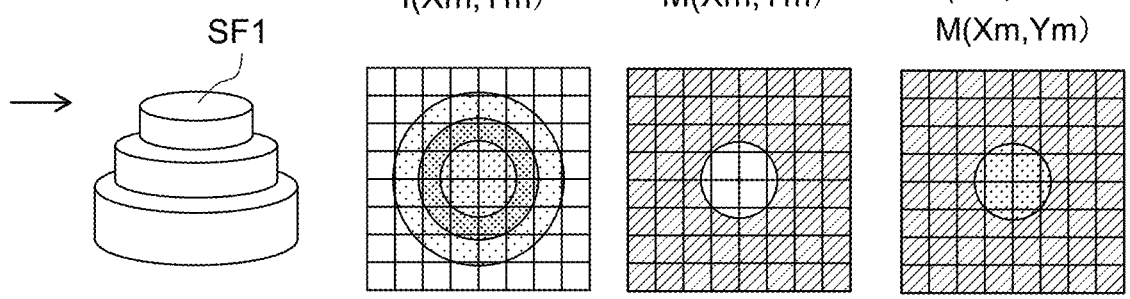
FIGS. 20A, 20B, and 20C are diagrams illustrating a second application of the three-dimensional position information acquiring method, where
Figure 20B:
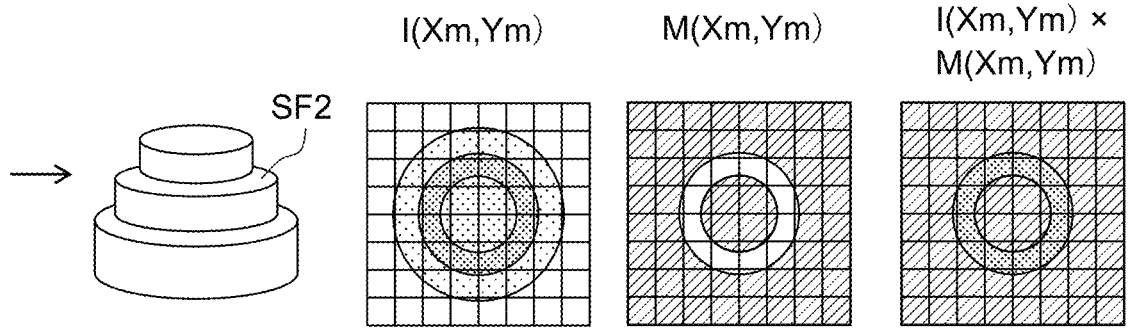
Figure 20C:
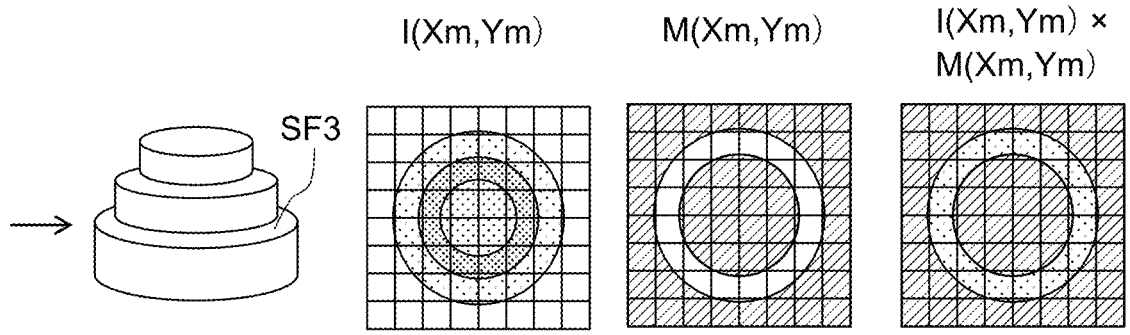

A second application of the three-dimensional position information acquiring method will be described. FIGS. 20A, 20B, and 20C are diagrams illustrating the second application of the three-dimensional position information acquiring method. FIG. 20A is a diagram showing a state in which the first level surface of the observed object coincides with the in-focus position and images acquired in that state. FIG. 20B is a diagram showing a state in which the second level surface of the observed object coincides with the in-focus position and images acquired in that state. FIG. 20C is a diagram showing a state in which the third level surface of the observed object coincides with the in-focus position and images acquired in that state.

In the three-dimensional position information acquiring apparatus according to this embodiment, an image of the first optical image is acquired by performing acquisition of the first optical image and an image of the second optical image is acquired by performing acquisition of the second optical image. Furthermore, by shifting the aperture 5a to the third position and the fourth position in addition to the first position and the second position, an image of the third optical image and an image of the fourth optical image are acquired. The four images of optical images thus acquired are images representing the light intensity, which is shown as I(Xm, Ym) in FIGS. 20A, 20B, and 20C.

When the predetermined computation is performed, subtraction is performed using the image intensity distribution $I_0$ of the first image and the image intensity distribution $I_{180}$ of the second image, and thereby a subtracted image $I_0 - I_{180}$ is generated. Furthermore, addition is performed using the image intensity distributions of these two images, and thereby a sum image $I_0 + I_{180}$ is generated. Then, subtraction is performed using the image intensity distribution $I_{90}$ of the third image and the image intensity distribution $I_{270}$ of the fourth image, and thereby a subtracted image $I_{90} - I_{270}$ is generated. Furthermore, addition is performed using the image intensity distributions of these two images, and thereby a sum image $I_{90} + I_{270}$ is generated.

Moreover, a normalized subtracted image $IN_x$ and a normalized subtracted image $IN_y$ are generated using the image intensity distributions of the four images. The subtracted image $IN_x$ and the subtracted image $IN_y$ are expressed by the following equations (20) and (21).

$$IN_x = (I_0 - I_{180})/(I_0 + I_{180}) \quad (20)$$

$$IN_y = (I_{90} - I_{270})/(I_{90} + I_{270}) \quad (21)$$

Then, a value close to 0 is set as a threshold δT. If the value of a pixel in the images $IN_x$ and $IN_y$ is smaller than the threshold, the value of that pixel is set to 1, and if the value of the pixel is larger than the threshold, the value of the pixel is set to 0. Thus, a binarized image $M_x$ for the image $IN_x$ and a binarized image $M_y$ for the image $IN_y$ are generated. The binarized images are shown as I(Xm, Ym)×M(Xm, Ym) in FIGS. 20A, 20B, and 20C.

The binarized image $M_x$ and the binarized image $M_y$ are expressed by the following equations (22) and (23).

$$M_x(Xm, Ym)=1 \quad (IN_x(Xm,Ym)<|\delta T|)$$

$$M_x(Xm, Ym)=0 \quad (IN_x(Xm,Ym)>|\delta T|) \quad (22)$$

$$M_y(Xm, Ym)=1 \quad (IN_y(Xm,Ym)<|\delta T|)$$

$$M_y(Xm, Ym)=0 \quad (IN_y(Xm,Ym)>|\delta T|) \quad (23)$$

The value of a pixel of the images IL and $IN_y$ corresponds to the amount of displacement $\Delta_x$ (Xm, Ym) and $\Delta_y$ (Xm, Ym) of the point spread function. Therefore, the value of a pixel of the images $IN_x$ and $IN_y$ close to 0 represents that the values of $\Delta_x$(Xm, Ym) and $\Delta_y$(Xm, Ym) are close to 0. Then, the values of $\delta z_x$(Xm, Ym) and $\delta z_x$(Xm, Ym) calculated by equation (7) are also close to 0. Therefore, the pixels that have value 1 in the images $M_x$(Xm, Ym) and $M_y$(Xm, Ym) represent the portions of the observed object S that are located at the in-focus position, and the pixels that have value 0 in the images $M_x$(Xm, Ym) and $M_y$(Xm, Ym) represent the portions of the observed object located away from the in-focus position.

By performing calculation for each pixel of the image information using the following equation (24), it is possible to obtain an image $I_{SEC}$(Xm, Ym) in which only the portions located at the in-focus position of the imaging optical system is extracted from the image of the observed object S. This image is shown as M(Xm, Ym) in FIG. 19C.

$$I_{SEC}(Xm, Ym) = \{I_0(Xm, Ym) + I_{90}(Xm, Ym) + I_{180}(Xm, Ym) + I_{270}(Xm, Ym)\} \times M_x(Xm, Ym) \times M_y(Xm, Ym) \quad (24)$$

An image of the observed object S is acquired by changing the relative position of the observed object S and the imaging optical system 3 is changed by an amount corresponding to $\delta T$, and I(Xm, Ym) is calculated at each position. By doing this, it is possible to detect a sectioning image of the observed object S at each position By reconstructing $M_x$(Xm, Ym)×$M_y$(Xm, Ym) using z-displacement amount corresponding to $\delta T$, it is possible to determine three-dimensional position information of the observed object. Furthermore, it is possible to determine the three-dimensional position structure of the observed object by reconstructing I(Xm, Ym).

$M_x$(Xm, Ym) may be calculated using an image obtained by applying sobel filter in the X direction to $IN_x$ instead of $IN_x$, and $M_y$(Xm, Ym) may be calculated using an image obtained by applying sobel filter in the X direction to $IN_y$ instead of $IN_y$.

Moreover, while a case in which images are acquired by rotating the aperture to the positions of 0°, 90°, 180°, and 270° has been described, images may be acquired by rotating the aperture to the positions of 0° and 180°, which are rotationally symmetric with each other. Even in the case where only the two images or the image intensity distribution $I_0$ of the first image and the image intensity distribution $I_{180}$ of the second image thus acquired are used, the same result can be obtained.

A third application of the three-dimensional position information acquiring method will be described. When determine the value of $\delta z$, $\Delta_x$ and $\Delta_y$ are calculated in each of the measurement areas. Since $\Delta_x$ is the amount of transverse image displacement of the image intensity distribution $I_{90}$ of the third image and the image intensity distribution $I_{270}$ of the fourth image in the X direction, when an image is generated from the image intensity distribution $I_{90}$ of the third image and the image intensity distribution $I_{270}$ of the fourth image, the generated image has image blur in the X direction in the pixel area corresponding to $\Delta_x$. Similarly, when an image is generated from the image intensity distribution $I_0$ of the first image and the image intensity distribution $I_{180}$ of the second image, the generated image has image blur in the Y direction in the pixel area corresponding to $\Delta_y$.

Therefore, composition of the image intensity distribution $I_{90}$ of the third image and the image intensity distribution $I_{270}$ of the fourth image is performed after correcting the transverse displacement of $\Delta_x$ in the X direction. If this composition is performed, since the transverse displacement of the image in the pixel area corresponding to $\Delta_x$ becomes 0, it is possible to generate an image at the in-focus position. On the other hand, in the pixel area in which the transverse displacement is originally 0, image shift by $-\Delta_x$ is caused. In this pixel area, although there is no image blur originally, image blur is generated by correction of $\Delta_x$. Therefore, in the pixel area in which the transverse displacement of the image is originally 0, correction of the transverse displacement is not performed.

As just described, the above-described processing, which change the in-focus position for each pixel by controlling the transverse displacement to correct image blur, is called refocus. In the Y direction also, refocus can be performed by performing composition of the image intensity distribution $I_0$ of the first image and the image intensity distribution $I_{180}$ of the second image after correcting the transverse displacement by $\Delta_y$.

In the process of refocus, composition of images is performed such that one of the image is shifted relative to a specific pixel of the other image, namely shift is performed by $\Delta_x$ between the image intensity distribution $I_{90}$ of the third image and the image intensity distribution $I_{270}$ of the fourth image with respect to the X direction and shift is performed by $\Delta_y$ between the image intensity distribution $I_0$ of the first image and the image intensity distribution $I_{180}$ of the second image with respect to the Y direction. The composite images generated with respect to the X and Y directions may be used to further generate another composite image. In this process, $\Delta_x$ and $\Delta_y$ are not necessarily integers, but in the image shift, the number of pixels is integer.

Therefore, in order to shift the image based on $\Delta_x$ and $\Delta_y$, an integer number of pixels $\Delta_x{}'$ corresponding to $\Delta_x$ and an integer number of pixels $\Delta_y{}'$ corresponding to $\Delta_y$ are calculated. Then, in the refocus of the image intensity distribution $I_{90}$ of the third image and the image intensity distribution $I_{270}$ of the fourth image, composition of images is performed such that the images are shifted relative to each other by $\Delta_x{}'$. In the refocus of the image intensity distribution $I_0$ of the first image and the image intensity distribution $I_{180}$ of the second image, composition of images is performed such that the images are shifted relative to each other by $\Delta_y{}'$.

In the above-described case, refocus is performed by shifting the images in units of pixels. Alternatively, refocus may be performed using equation (12). Since the relationship between the transverse displacement amount $\Delta$ and the sum image can be known from equations (10) and (12), if the value of $\Delta$ is determined by measurement, correction (or refocus) can be performed. As described before, it is possible to calculate the value of $\Delta$ from equation (14).

For the sake of simplicity of description, equation (12) expresses calculation in one dimension. Actually, calculation is performed in two dimensions. Therefore, $\Delta$ in equation (12) has components in the X and Y directions. Thus, $\Delta_x$ is used as the X component and $\Delta_y$ is used as the Y component, and the both sides of equation (12) is divided by $\cos(2\pi\Delta f)$. Since the term having $\Delta$ in the right side of equation (12) is eliminated by this division, right side of equation (12) after the division does not contain transverse displacement.

Since the left side of equation (12) represents the image intensity distribution of the sum image, the result of calculation of the right side of equation (12) also represents the image intensity distribution of the sum image. Therefore, by performing Fourier transform for the result of calculation of the right side after the division, the image intensity distribution of the sum image without transverse displacement is acquired. In other words, since transverse displacement can be corrected with respect to the X direction and the Y directions of the image, an image in focus can be generated.

In this process, the values used in the aforementioned division are not $\Delta_x'$ and $\Delta_y'$ as integers but non-integers $\Delta_x$ and $\Delta_y$. In other words, $\Delta$ is not limited to an integer. Therefore, refocus with a transverse displacement smaller than one pixel can be achieved. As a result of this, more accurate image blur correction (refocus) can be carried out.

In the three-dimensional position information acquiring apparatus 11 according to the first embodiment, an image of a fluorescent image is acquired. Then, with the image intensity distributions $I_0$, $I_{90}$, $I_{180}$, and $I_{270}$, an integer pixel number $\Delta_x'$(Xm, Ym) corresponding to $\Delta_x$(Xm, Ym) and an integer pixel number $\Delta_y'$(Xm, Ym) corresponding to $\Delta_y$(Xm, Ym) are calculated for each pixel.

Refocus is performed for the image intensity distribution $I_{90}$ of the third image and the image intensity distribution $I_{270}$ of the fourth image by using the integer pixel number $\Delta_x'$(Xm, Ym), and recovery from an image blur with respect to the X direction in the pixel area corresponding to $\Delta_x'$(Xm, Ym) is performed. Then, refocus is performed for the image intensity distribution $I_0$ of the first image and the image intensity distribution $I_{180}$ of the second image by using the integer pixel number $\Delta_y'$(Xm, Ym), and recovery from an image blur with respect to the Y direction in the pixel area corresponding to $\Delta_y'$(Xm, Ym) is performed.

By performing refocus for each pixel, a fluorescent image $I_x$ at the in-focus position which is recovered from an image blur with respect to the X direction is generated, and a fluorescent image $I_y$ at the in-focus position which is recovered from an image blur with respect to the Y direction is generated. A composite fluorescent image I is formed from the fluorescent image $I_x$ and the fluorescent image $I_y$. The fluorescent image $I_x$ and the fluorescent image $I_y$ are both images at the in-focus position free from blur. Therefore, the fluorescent image I is also an image at the in-focus position free from blur. In consequence, by performing refocus, since the fluorescent image I is an image at the in-focus position in all the pixels, it is possible to generate an image that appears to have no distance information with respect to the Z direction (all-in-focus image).

Furthermore, it is possible to associate the fluorescent light intensity with each position information in the observed object by using the fluorescent image I and binarized three-dimensional image information S(Xm, Ym, $\Delta'$(Xm, Ym)). Thus, it is possible to generate a three dimensional fluorescent image of the observed object.

A fourth application of the three-dimensional position information acquiring method will be described. In the three-dimensional position information acquiring apparatus 30 according to the third embodiment, an image of a differential phase image is acquired. Since the acquired image represents the phase of light, it is possible to obtain a phase distribution.

Deconvolution is performed on the image intensity distribution $I_0$ of the first image, the image intensity distribution $I_{90}$ of the third image, and the image intensity distribution $I_{180}$ of the second image, and the image intensity distribution $I_{270}$ of the fourth image, and thereby the phase distributions $\varphi_0$(Xm, Ym), $\varphi_{90}$(Xm, Ym), $\varphi_{180}$(Xm, Ym), and $\varphi_{270}$(Xm, Ym) of the observed object are reproduced.

Refocus is performed for $\varphi_{90}$(Xm, Ym) and $\varphi_{270}$(Xm, Ym) using the integer pixel number $\Delta_x'$(Xm, Ym), and thereby a phase distribution $\varphi_x$(Xm, Ym), which is obtained from composition of the two images and has no image blur in all the pixel, is generated. Then, refocus is performed for $\varphi_0$(Xm, Ym) and $\varphi_{180}$(Xm, Ym) using the integer pixel number $\Delta_y'$(Xm, Ym), and thereby a phase distribution $\varphi_y$(Xm, Ym), which is obtained from composition of the two images and has no image blur in all the pixel, is generated. Then, a phase distribution $\varphi$(Xm, Ym) that is not affected by blur of the observed object can be calculated from $\varphi_x$(Xm, Ym) and $\varphi_y$(Xm, Ym).

Furthermore, it is possible to obtain a three-dimensional phase distribution of the observed object from the phase distribution $\varphi$(Xm, Ym), the binarized three-dimensional image information $\varphi_x$(Xm, Ym, $\Delta'$(Xm, Ym)), and $\delta F$.

According to the present invention, it is possible to provide a three-dimensional position information acquiring method and a three-dimensional position information acquiring apparatus that can measure the amount of displacement of an observed object from the in-focus position of an optical system even in the case where the amount of displacement corresponds to an amount which is smaller than the depth of focus of the imaging optical system and has high resolution in the direction along the optical system.

As above, in the three-dimensional position information acquiring method and the three-dimensional position information acquiring apparatus according to the present invention, it is possible to measure efficiently the amount of displacement of an observed object from the in-focus position of an optical system even in the case where the amount of displacement corresponds to an amount which is smaller than the depth of focus. Therefore, the present invention can be applied to a method and apparatus for acquiring three-dimensional position information to enable high resolution in the direction along the optical axis.

What is claimed is:

1. A three-dimensional position information acquiring method comprising:
   acquiring image data of a first optical image;
   acquiring image data of a second optical image after acquiring the image data of the first optical image;
   performing subtraction processing using the image data of the first optical image and the image data of the second optical image, to generate a subtracted image;
   dividing the subtracted image into a plurality of measurement areas;
   performing Fourier transform for the subtracted image in each of the measurement areas, wherein Fourier coefficients are calculated in each of the measurement areas by the Fourier transform;
   acquiring three-dimensional position information about an observed object; and
   determining whether the observed object is displaced on a front side or on a rear side relative to an in-focus position,
   wherein:
   acquisition of the image data of the first optical image is performed based on light beams having passed through a first area, acquisition of the image data of the second optical image is performed based on light beams having passed through a second area, a position of a center of the first area and a position of a center of the second area are both away from an optical axis of an optical system in a plane perpendicular to the optical axis of the optical system, the first area and the second area respectively include at least portions that do not overlap with each other, and the first area and the second area are formed at rotationally symmetric positions.

2. A three-dimensional position information acquiring apparatus comprising:

a light source;

an illumination optical system that guides light from the light source to an observed object;

an imaging optical system that forms an image of the observed object;

an image pickup element;

an aperture element having an aperture that allows a portion of light coming from points on the observed object to pass through the aperture, wherein a first area is formed by positioning the aperture at a first position and a second area is formed by positioning the aperture at a second position;

a drive unit that drives the aperture element; and a processing device that is configured to control the three-dimensional position information acquiring apparatus to perform processing including:

acquiring image data of a first optical image based on light beams having passed through the first area, acquiring image data of a second optical image based on light beams having passed through the second area, after acquiring the image data of the first optical image, and performing subtraction processing using the image data of the first optical image and the image data of the second optical image, to generate a subtracted image;

performing Fourier transform for the subtracted image; and calculating three-dimensional position information about the observed object in which an object side displacement amount corresponds to an amount which is smaller than a depth of focus, wherein: the aperture element is arranged in one of the illumination optical system and the imaging optical system;

a position of a center of the first area and a position of a center of the second area are both away from an optical axis of said one of the illumination optical system and the imaging optical system in a plane perpendicular to the optical axis of said one of the illumination optical system and the imaging optical system, and the first area and the second area respectively include at least portions that do not overlap with each other.

3. A three-dimensional position information acquiring apparatus according to claim 2, wherein the image data of the first optical image and the image data of the second optical image are obtained by the same image pickup element.

4. A three-dimensional position information acquiring apparatus according to claim 2, wherein the aperture element is arranged at one of a pupil position of the illumination optical system, a pupil position of the imaging optical system, and a position conjugate with the pupil position of the imaging optical system.

* * * * *